(12) United States Patent
Sokar et al.

(10) Patent No.: US 11,182,525 B1
(45) Date of Patent: Nov. 23, 2021

(54) FAULT AWARE ANALOG MODEL (FAAM)

(71) Applicant: Infineon Technologies AG, Neubiberg (DE)

(72) Inventors: Ahmed Sokar, Munich (DE); Dieter Haerle, Villach (AT); Petar Tzenov, Nuremberg (DE); Anis Chenbeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/922,278

(22) Filed: Jul. 7, 2020

(51) Int. Cl.
*G06F 30/367* (2020.01)
*G06N 20/00* (2019.01)
*G06F 119/02* (2020.01)

(52) U.S. Cl.
CPC .......... *G06F 30/367* (2020.01); *G06N 20/00* (2019.01); *G06F 2119/02* (2020.01)

(58) Field of Classification Search
CPC .... G06F 30/367; G06F 2119/02; G06N 20/00
USPC ........................................................ 716/104
See application file for complete search history.

(56) References Cited

U.S. PATENT DOCUMENTS

| | | | | |
|---|---|---|---|---|
| 7,279,987 B1* | 10/2007 | Kaszynski | ................ | H03L 7/08 331/1 A |
| 8,875,077 B1* | 10/2014 | O'Riordan | ............ | G06F 30/367 716/112 |
| 9,058,440 B1* | 6/2015 | Kolpekwar | ............. | G06F 30/33 |
| 9,372,946 B2 | 6/2016 | Sunter | | |
| 10,346,273 B2* | 7/2019 | Fricano | ............ | G01R 31/31835 |
| 10,528,692 B1* | 1/2020 | Guo | ..................... | G06F 30/3323 |
| 2009/0307638 A1* | 12/2009 | McConaghy | ........... | G06F 30/36 716/104 |
| 2010/0229061 A1* | 9/2010 | Hapke | ............ | G01R 31/318342 714/740 |
| 2010/0306722 A1* | 12/2010 | LeHoty | ................. | G06F 30/367 716/106 |
| 2013/0054161 A1* | 2/2013 | Hapke | ................... | G06F 30/367 702/59 |
| 2015/0234978 A1* | 8/2015 | Tang | ..................... | G06F 11/261 716/112 |

(Continued)

OTHER PUBLICATIONS

Mathematical Model; Webpage; Wikipedia https://en.wikipedia.org/wiki/Mathematical_model#:~:text=A%20mathematical%20model%20is%20a,model%20is%20termed%20mathematical%20modeling.

(Continued)

*Primary Examiner* — Suresh Memula
(74) *Attorney, Agent, or Firm* — Eschweiler & Potashnik, LLC

(57) ABSTRACT

A fault aware analog model (FAAM) system is disclosed. The FAAM system comprises a FAAM builder module comprising a model construction module configured to receive a reference dataset associated with a circuit block. The reference dataset comprises a set of data values that defines input to output relationship of the circuit block for both in spec and out of spec operation of the circuit block. The reference data set is derived based on data associated with a ground truth representation of the circuit block. In some embodiments, the model construction module is further configured to generate a FAAM comprising a behavioral model of the circuit block, based on the reference dataset, wherein the FAAM is configured to approximate the input to output relationship of the circuit block that is defined by the set of data values in the reference dataset.

25 Claims, 13 Drawing Sheets

(56) References Cited

U.S. PATENT DOCUMENTS

| | | | | |
|---|---|---|---|---|
| 2018/0060472 A1* | 3/2018 | Chen | ................... | G01R 31/317 |
| 2019/0065962 A1* | 2/2019 | Busch | ..................... | G06N 3/04 |
| 2020/0271720 A1* | 8/2020 | He | ........................ | G06N 20/00 |
| 2020/0394354 A1* | 12/2020 | He | ........................ | G06F 30/367 |

OTHER PUBLICATIONS

Behavioral Modeling; Webpage; Wikipedia https://en.wikipedia.org/wiki/Behavioral_modeling.

Serving Models; TensorFlow; Guide edited Mar. 31, 2020; Webpage https://www.tensorflow.org/tfx/guide/serving.

Park, Joonsung et al.; "Defect-Based Analog Fault Coverage Analysis using Mixed-Mode Fault Simulation"; Computer Engineering Research Center; The University of Texas at Austin; 2009 IEEE.

Hasani, Ramin M. et al;"Efficient Modeling of Complex Analog Integrated Circuits Using Neural Networks"; Institute of Computer Engineering, Vienna Institute of Technology, Vienna Austria.

Bungartz et al.; "Sparse Grids"; Cambridge University Press; Acta Numerica (2004); United Kingdom; 2004.

Garcke et al.; "A dimension adaptive sparse grid combination technique for machine learning"; Centre for Mathematics and its Applications, Mathematical Sciences Institute, Australian National University, Canberra, Australia and Technische Universitat Berlin, Institut fur Mathematik, Sekretariat MA.

Fraccaroli et al; "Analog Fault Testing Through Abstraction"; Department of Computer Science, University of Verona, Italy; 2017.

Zwolinski, Mark et al.; "Behavioural Modelling of Analogue Faults in VHDL-AMS—A Case Study"; Electronic Systems Design Group, School of Electronics and Computer Science, University of Southampton; 2004.

Sequeira, Jyotsna et al.; "Fault Simulation for Analog Test Coverage"; Intel Corporation; 2016.

Yilmaz, Ender et al.; "Fault Analysis and Simulation of Large Scale Industrial Mixed-Signal Circuits"; Freescale Corp.; Arizona State University; 2013.

Yang, Z.R. et al.; "Fast, Robust DC and Transient Fault Simulation for Nonlinear Analogue Circuits"; Department of Electronics and Computer Science, University of Southampton.

IEEE Computer Society; "Draft Standard for Analog Defect Modeling and Coverage"; P2427/D0.26, TBD 2021; 2020; The Institute of Electrical and Electronics Engineers, Inc.

Garcke, Jochen; "Sparse Grids in a Nutshell"; Institut fur Numerische Simulation.

Gerstner, Thomas et al.; "Numerical integration using sparse grids"; Numerical Algorithms 18; 1998; pp. 209-232.

IEEE; "IEEE P2427 Working Group Webpage" https://sagroups.ieee.org/2427/.

IEEE; "P2427—Standard for Analog Defect Modeling and Coverage"; Feb. 15, 2018.

* cited by examiner

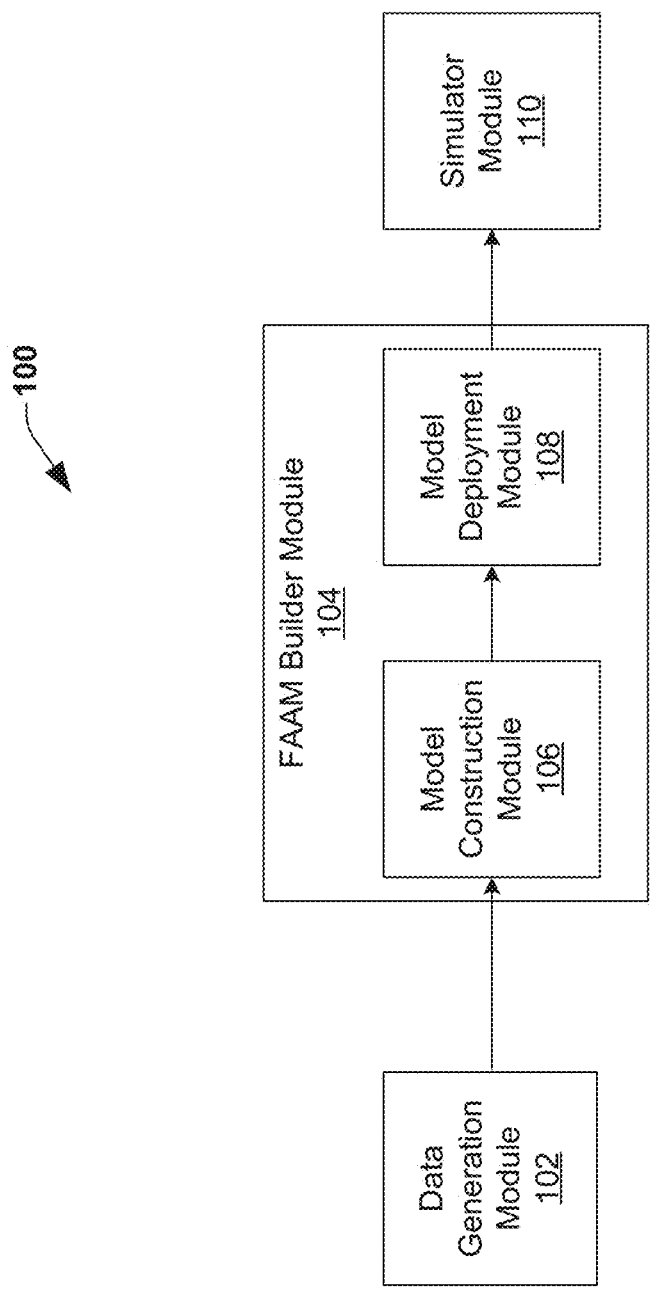

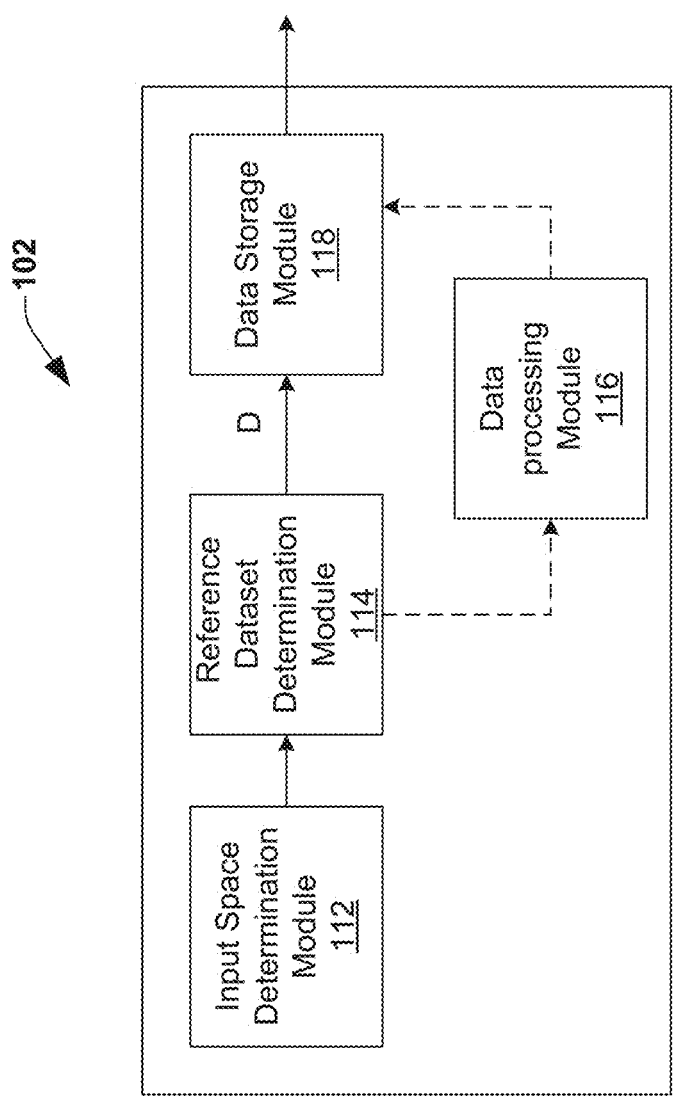

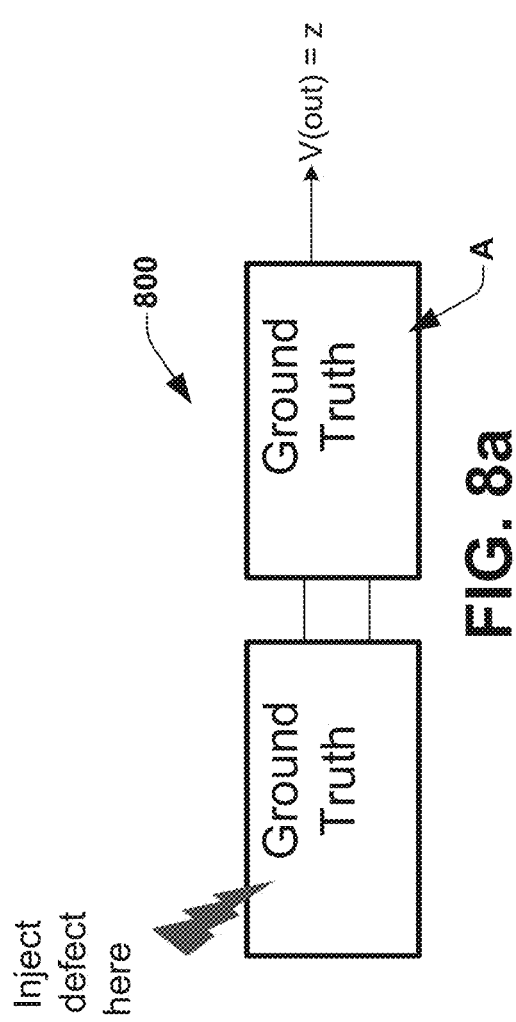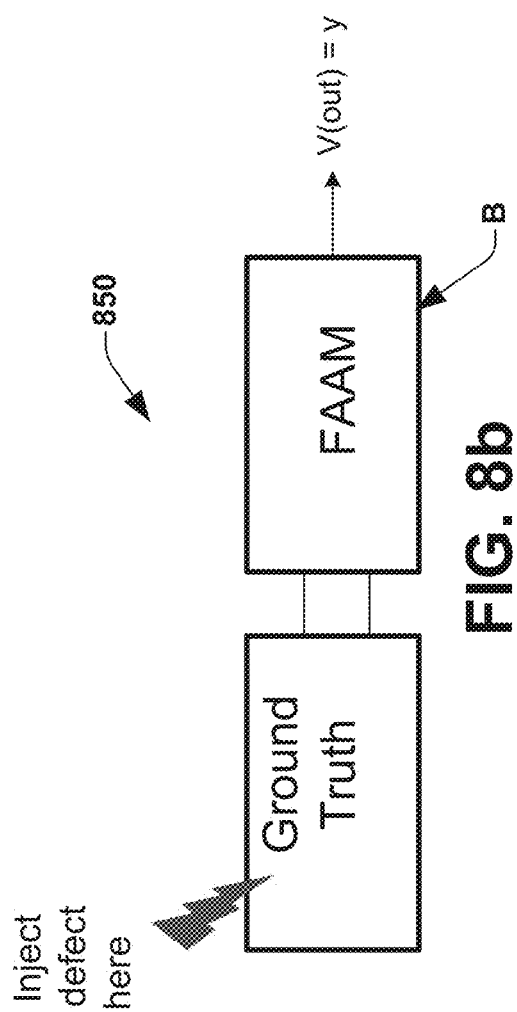
FIG. 8a
FIG. 8b

FAULT AWARE ANALOG MODEL (FAAM)

FIELD

The present disclosure relates to behavioral models, and in particular, to a system and method to develop data driven behavioral models that are fault-aware.

BACKGROUND

As the standard for analog defect modeling and test coverage is emerging in IEEE (Working Group P2427), semiconductor companies will be required to deliver test coverage metrics to the customers. An analog defect is generally an unintended topological, structural or parametric change in a circuit, which might or might not cause faulty behavior. In this context, test coverage metrics measure the overall capability of a test program to find defects such as hard defects (open and short circuits) and/or soft/parametric defects (change in a process parameter of a circuit element), which could be present in the circuit due to unintended production errors or post-manufacturing mishandling. Knowledge about the coverage of a test program during analog testing is important, as it provides the probabilities that the Integrated Circuit (IC) does or does not contain a fault, given that the test program has passed.

BRIEF DESCRIPTION OF THE DRAWINGS

Some examples of circuits, apparatuses and/or methods will be described in the following by way of example only. In this context, reference will be made to the accompanying Figures.

FIG. 1a illustrates a simplified block diagram of a fault aware analog model (FAAM) system, according to one embodiment of the disclosure.

FIG. 1b illustrates a simplified block diagram of a data generation module, according to one embodiment of the disclosure.

FIG. 8a and FIG. 8b illustrates an original circuit and a FAAM circuit, respectively, to be utilized for ADS in a simulator module, according to on embodiment of the disclosure.

DETAILED DESCRIPTION

Figure 2A:
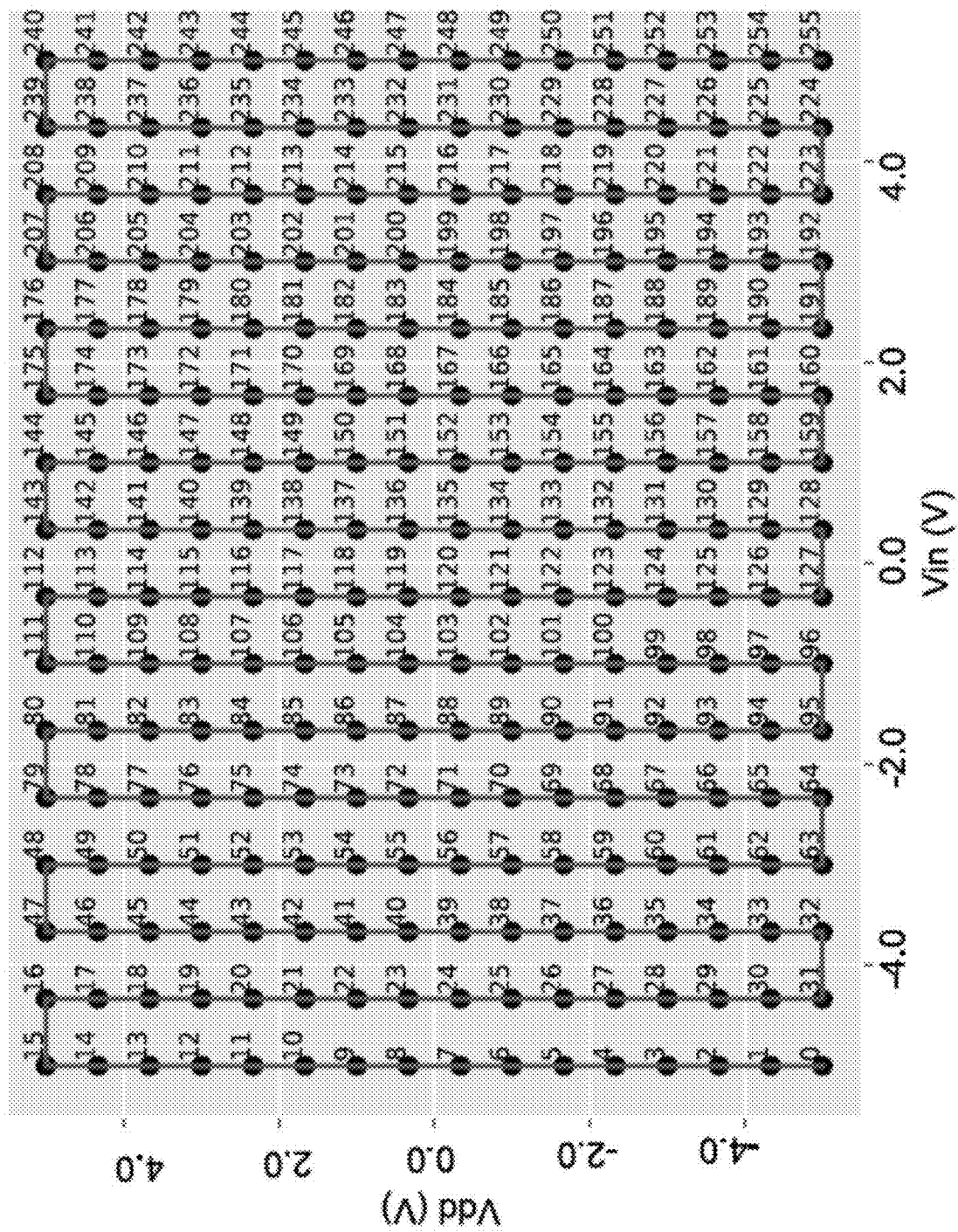
FIG. 2a depicts a two-dimensional input space traversal on a full grid, according to one embodiment of the disclosure.

In one embodiment of the disclosure, a fault aware analog model (FAAM) system is disclosed. The FAAM system comprises a FAAM builder module comprising a model construction module configured to receive a reference dataset associated with a circuit block. In some embodiments, the reference dataset comprises a set of data values that defines input to output relationship of the circuit block for both in spec and out of spec operation of the circuit block, wherein the reference data set is derived based on data associated with a ground truth representation of the circuit block. The model construction module is further configured to generate a FAAM comprising a behavioral model of the circuit block, based on the reference dataset. In some embodiments, the FAAM is configured to approximate the input to output relationship of the circuit block that is defined by the set of data values in the reference dataset.

In one embodiment of the disclosure, a simulator module is disclosed. The simulator module comprises a circuit block simulator module configured to simulate at least one circuit block, wherein the at least one circuit block is implemented using fault aware analog model (FAAM) of the circuit block, thereby forming a FAAM circuit block. In some embodiments, the FAAM comprises a behavioral model that is configured to approximate input to output relationship of the circuit block for both in spec and out of spec operation of the circuit block. In some embodiments, the FAAM is derived based on a reference dataset comprising a set of input values and a corresponding set of output values of the circuit block for both in spec and out of spec operation of the circuit block, wherein the reference dataset is determined based on data associated with a ground truth representation of the circuit block.

In one embodiment of the disclosure, a simulator module is disclosed. The simulator module comprises a circuit block simulator module configured to simulate at least one circuit block. In some embodiments, the simulator module further comprises an application program interface (API) module configured to couple the circuit block simulator module to one or more machine learning libraries, in order to enable the circuit block simulator module to simulate the at least one circuit block.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit", "module" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, with the emerging standard for analog defect modeling and test coverage in IEEE, semiconductor companies will be required to deliver test coverage metrics to the customers. Test coverage metrics measure the overall capability of a test program to find defects such as hard defects/faults (open and short circuits) and/or soft/parametric defects/faults (change in a process parameter of a circuit element) in a circuit. In order to calculate the test coverage metrics of the test program for the circuit (e.g., an analog circuit), analog defect simulation (ADS) of the circuit, referred to herein as a test circuit or a module under test, is performed. To perform ADS on the test circuit, potential defects are extracted from the test circuit according to the IEEE definitions. Further, the defects are then injected one by one in to the test circuit (or an integrated circuit (IC) associated therewith) where with each new defect, the faulty circuit (i.e., the test circuit) is simulated/re-simulated. The test program defines a set of specification limits $B1$, $B2$ . . . $Bn$, for various performances $P1$, $P2$, . . . $Pn$ of the circuit. Further, to determine the test coverage metrics of the test program, the test program is executed for each defect simulation of the test circuit. If, during the ADS simulation, any of the performances is out of the test specification, the test is recorded as 'Failed' and the corresponding defect is considered detected. Thus, in its simplest form, the test coverage metric of a test program is calculated as the number of defects detected by the test program, divided by the total number of defects simulated during the ADS.

Typically, during ADS, a single defect is injected per simulation. Therefore, the number of simulations which are needed to calculate the test coverage metrics is proportional to the number of possible defects in the IC, which in turn is proportional to the number of circuit devices. In a non-limiting example, a three terminal device such as a transistor (by excluding the bulk), could have 3 possible open circuits (one open per terminal) and 3 possible short circuits (a short between each two terminals). In addition, if parametric defects (e.g. deviation of the transistor area from the specifications, caused by manufacturing errors etc.) are considered, this can sum up to more than 6 potential defects per device. Given that a modern analog circuit can contain tens or even hundreds of thousands of transistors, where a single simulation can sometimes require more than 10 hours of simulation time, it becomes evident that complete enumeration of the defect universe is impractical even with the help of the most powerful compute clusters. This problem mandates the investigation of speedup mechanisms which can reduce the defect universe and/or accelerate the simulation time per injected defect.

Using high level behavioral models in place of one or more transistor level circuit blocks associated with the test circuit is one of the approaches to speed up simulations. In some aspects, the transistor level circuit block refers to a ground truth of a circuit. In some aspects, the ground truth refers to a system (either in its actual physical implementation or in its lowest available netlist implementation) which serves as a reference point, defining how the circuit shall respond to any combination of input stimuli. The outputs of that system (even though those might contain noise, as in case of laboratory measurements, or numerical errors as in the case of simulation results) are considered a closest representation of how the circuit maps input to output signals. In some embodiments, the lowest level netlist comprises a circuit netlist description available at its lowest level of abstraction. During the design stage, this could be for example a transistor level pre-layout SPICE netlist, or it could be the layout/post-layout physical implementation netlist etc. In some embodiments, the behavioral model mimics the functionality of the ground truth of the circuit block. In some embodiments, the behavioral model comprises an abstraction which refers to any computable parametric transformation $f_\theta : A \rightarrow B$, mapping elements from an input set A to elements from an output set B. Typically, such a model would contain multiple degrees of freedom (parameters or model parameters), denoted with the subscript parameter θ, which upon their adjustment can yield a different transformation from A to B. During ADS, the circuit blocks where defects are injected are kept in their ground truth representation and the other circuit blocks are replaced with their behavioral models to speed up the simulation time.

Behavioral models in current implementations comprise hand-written models of the circuit blocks that defines the input to output relationship of a circuit block using a mathematical relation of a set of circuit parameters. Specifically, the hand-written models comprise a set of mathematical equations that defines the input to output relationship of the circuit block using a set of input parameters and a set of output parameters associated with the circuit block. In some embodiments, the hand-written models are derived based on some physical assumptions/laws associated with the circuit block. For example, for an amplifier, the hand-written model may include the following relation, Vout=A× Vin, where Vout is the amplifier output, Vin is the amplifier input and A is the amplifier gain. The hand-written models in the current implementations are developed to mimic the functionality of the circuit within some predefined range of design specifications (although sometimes the hand-written models can be extended beyond those specifications to detect one or more fault conditions outside of the predefined range, for example, missing supply voltage and increase in the current consumption). Specifically, the hand-written models in the current implementations are configured to mimic the functionality of the circuit within some predefined specification range, referred to herein as in-spec operation or a normal operating range (plus one or more fault conditions, in some embodiments) for which the circuit is designed for and not during all possible operating range/conditions (e.g., out of spec operation or abnormal operation range). Such hand-written models are referred to herein as nominal hand-written models/nominal models.

In Analog Defect Simulation (ADS), if used, a behavioral model has to react correctly to cases such as low supply voltage, low biasing current, an oscillating reference voltage, etc. All of these effects and many more could happen as a result of injecting defects in the preceding circuit blocks (sometimes referred to herein as source blocks). The behavioral model should be capable to react to these stimuli that are outside of the nominal function (i.e., the normal operation range) for which the circuit is designed for. However, the nominal models utilized in current implementations don't guarantee correct behavior if a defect is injected in the circuit path of the stimuli's blocks, as the effect of this defect is generally unknown. In other words, the nominal models don't guarantee the correct model response when presented with faulty inputs (for example, when defects are injected in the source blocks). By correct response, it is meant that an ADS on a behavioral model shall deliver the same or approximately the same response as the lowest-available netlist representation of the circuit (which could be e.g. the design-intent netlist in transistor level representation). Specifically, as indicated above, the nominal models used in the current implementations are derived to give a correct response when the input values are within the in-spec range or the normal operation range. However, when the input values vary from the in-spec range to out of spec operation range or abnormal operation range (e.g., due to the defects injected during ADS in the preceding circuit blocks or source blocks), the nominal models may give outputs based on the mathematical relation which may be different from actual response of the transistor level circuit block or may not give any response at all. Therefore, the current nominal hand-written models might not propagate the effect of a defect/unexpected input correctly to the model output. This leaves designers and verification engineers with the option of performing expensive transistor level ADS simulation runs, which, as already elaborated above, might take a prohibitive amount of time and come at prohibitive costs.

Developing a hand-written model, which cover all possible combinations of the input signals (i.e., both in-spec and out of spec) and reacts correctly to them is impractical, high effort and may not guarantee full coverage of all possible values of the input stimuli. Therefore, a system and a method to develop fault aware analog models (FAAMs) that compute the same or approximately the same output as compared to the ground truth, when presented with in-spec inputs and unexpected or out of spec inputs, using data-driven methods, is disclosed herein. In some embodiments, the FAAM comprises a behavior model, the computed response of which is the same or approximately the same as the ground truth, given the same input stimuli. In some embodiments, the FAAM is developed in a data driven way using a reference data set that defines input to output relationship of a circuit block for both in spec and out of spec operation of the circuit block. In some embodiments, the FAAM is developed in a way that it mimics the input output relationship of the circuit block that is defined by the reference dataset. In one embodiment, a method to develop a FAAM based on extending nominal models with out-of-spec behavior using the reference data set is disclosed. Further, in another embodiment, a method to develop a FAAM based on parametric models, the parameters of which are fitted/trained based on a reference data set, in a way that the FAAM represent the underlying data-generating process as closely as possible, is disclosed. Since the FAAM mimics the functionality of the modelled circuit block during both in spec and out of spec operation, FAAMs can be reliably used in ADS, which greatly reduces the ADS time.

FIG. 1a illustrates a simplified block diagram of a fault aware analog model (FAAM) system 100, according to one embodiment of the disclosure. The FAAM system 100 is configured to generate a FAAM of a circuit block. In some embodiments, the circuit block comprises a transistor level circuit block or ground truth. In some embodiments, the circuit block that needs to be modelled, is referred to as a modelled circuit block/target circuit block. In some embodiments, the target circuit block may comprise a simple inverter circuit, an amplifier circuit etc. However, in other embodiments, the target circuit block may include any other electronic circuit/components. In some embodiments, the target circuit block may be part of a circuit comprising a plurality of circuit blocks. The FAAM system 100 includes a data generation module 102, a FAAM builder module 104 and a simulator module 110. In some embodiments, the data generation module 102, the FAAM builder module 104 and the simulator module 110 may be part of a same computing environment. For example, the data generation module 102, the FAAM builder module 104 and the simulator module 110 may be part of a same computer. Alternately, in other embodiments, the data generation module 102, the FAAM builder module 104 and the simulator module 110 may be part of different computing environments.

The data generation module 102 is configured to generate a reference data set D comprising a set of data values that defines input to output relationship of the target circuit block for both in spec and out of spec operation of the target circuit block. In some embodiments, the in spec operation refers to a normal operation of the target circuit block (in other words, when the target circuit block is operating within normal design specifications of inputs of the circuit block). Further, out of spec operation of the target circuit block refers to an abnormal operation of the target circuit block (in other words, when the target circuit block is operating outside of the normal design specifications of inputs of the circuit block). In some embodiments, the reference data set is derived based on data associated with a ground truth representation of the target circuit block. In some embodiments, the data may include measurement data, for example, physical measurements or simulation measurements/waveforms. In some embodiments, the set of data values within the reference dataset comprises a set of input values/parameters that covers in spec and out of spec range of input values/parameters for the target circuit block, and a corresponding set of output values/parameters measured using the ground truth representation of the target circuit block. In some embodiments, the in spec and the out of spec range of input values/parameters for the target circuit block covers all the possible variations of the input values/parameters of the target circuit block that encapsulate any possible user specification and any possible defect that might occur in any of the circuit blocks connected to the target circuit block. In some embodiments, each entry in the reference dataset can include a plurality of input values and a plurality of output values. A point in the reference dataset may be denoted with the pair (X, Y), where X denotes the value(s) of the input(s) and Y the value(s) of the output(s) being modelled. The mapping X→Y is considered as the ground truth, which the FAAM aims to approximate. In some embodiments, X and Y are multi-dimensional, that is, X can include multiple input parameters and Y can include multiple output parameters.

In some embodiments, the data generation module 102 comprises an input space determination module 112, a reference dataset determination module 114, a data processing module 116 and a data storage module 118 as shown in FIG. 1b. In some embodiments, the input space determination module 112 is configured to identify the target circuit block based on information provided by an end-user. Further, the input space determination module 112 is configured to determine input interfaces and output interfaces associated with the target circuit block. In some embodiments, the input interfaces and the output interfaces correspond to the types of input values/parameters and the output values/parameters, respectively, to be included in the reference dataset. The input interfaces chosen are not limited to electrical signals only. A FAAM model input can also be circuit model parameter(s) (e.g. transistor dimensions, threshold voltages etc.), operating conditions (e.g. temperature) and others. In some embodiments, the input space determination module 112 is configured to determine the input interfaces and the output interfaces based on information provided by an end-user. Alternately, in other embodiments, the input space determination module 112 may be configured to determine the input interfaces and the output interfaces based on predefined information on the input interfaces and the output interfaces stored in a memory module associated therewith.

Upon determining the input and output interfaces, the input space determination module 112 is further configured to determine/define an input space comprising a range of input values for each of the input interfaces to be utilized to determine the reference dataset. In some embodiments, the range of input values for each of the input interfaces comprises both in-spec and out-of-spec input values. In some embodiments, the input space determination module 112 is configured to determine/define the input space based on information received from an end user (e.g., from an analog designer). Alternately, in other embodiments, the input space determination module 112 is configured to determine/define the input space based on predefined information stored in a memory module associated therewith. As an illustrative example, assume that the modelled/target circuit block is a simple inverter, and that data collection is performed via transistor level netlist simulations, where the inverter circuit is represented with its lowest available netlist (ground truth). This simple circuit generally defines three inputs: the positive supply voltage signal (Vdd), the negative supply voltage (Vss) and the input signal (Vin).

For simplicity, in this example the negative supply voltage is fixed to Vss=0V, which reduces the input space to 2 dimensions: Vin and Vdd. The output of the block is denoted as Vout. Now, assuming all other parameters fixed, the inverter circuit can be considered as a map from the pair of values (Vin, Vdd) to the value at the output pin Vout. Further, it is assumed that, according to design specifications, the inverter shall operate with Vdd fixed at 1V, and the input signal shall periodically vary between 0V and 1V. These numbers define the in-spec input values of the circuit and can change depending on the use-case. In order to ensure that the data included in the reference dataset is specification agnostic, the input-output relationship is mapped over an extended range of input stimuli, wide enough to encapsulate any possible user specification and any possible defect that might occur in any of the external blocks connected to the ports of our inverter. Therefore, the input space is defined to include both faulty (or out of spec) and in-spec inputs of the inverter circuit. Therefore, to cover the in-spec and out-of-spec input values, the input space (e.g., the values of Vin and Vdd) can be extended over a wide enough range, for example between −5V and 5V.

Figure 2B:
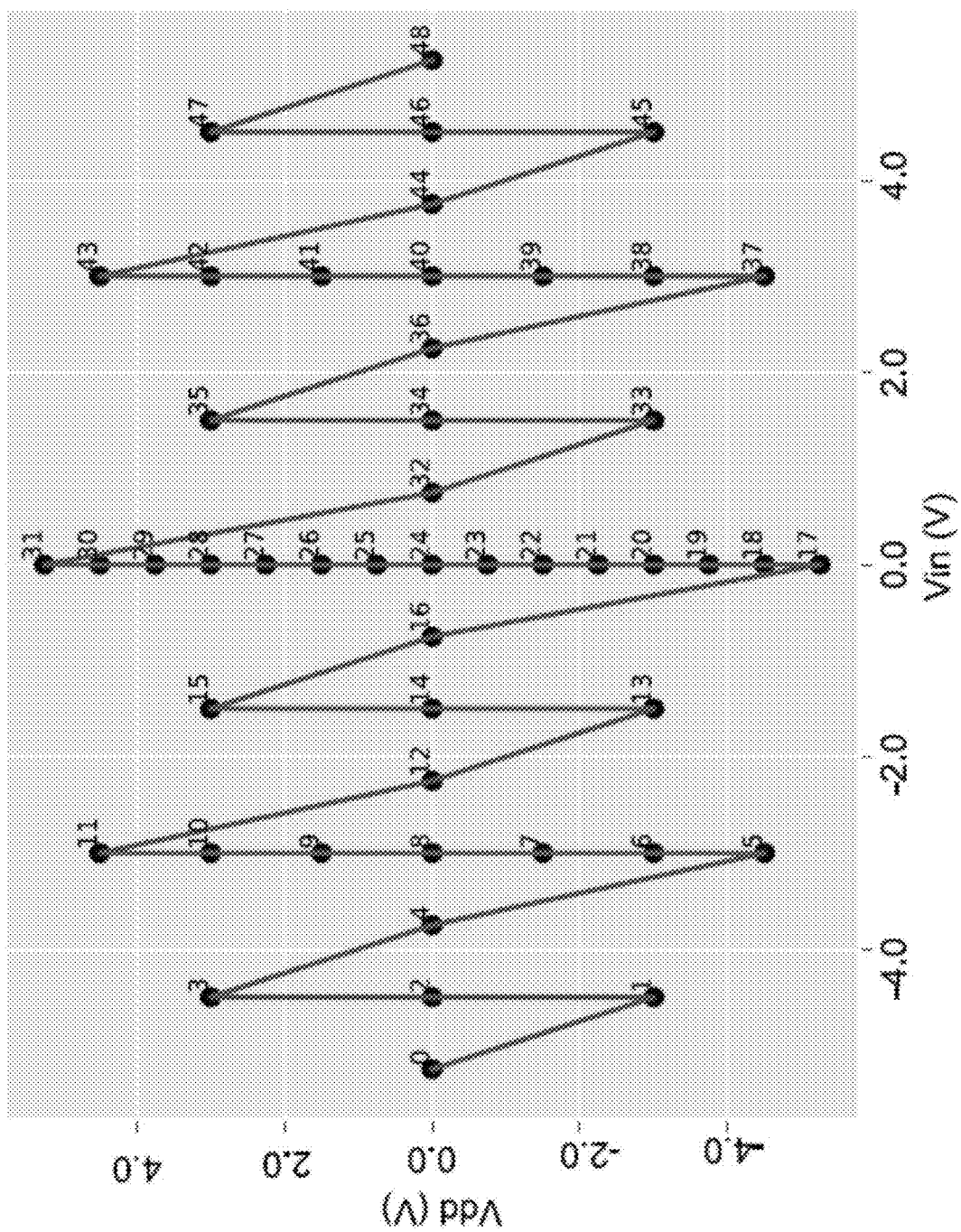
FIG. 2b depicts a two-dimensional input space traversal on a sparse grid, according to one embodiment of the disclosure.

Upon determining the input space, the input space determination module 112 is further configured to discretize the input space to determine a test bench comprising a set of input values (multi-dimensional) within the input space to be utilized to form the reference dataset. In one embodiment, the input space is discretized in each dimension (assuming d-dimensional input space), and a d-dimensional grid is constructed as the Cartesian products of these d 1-dimensional grids to form the test bench. This 1-dimensional discretization can be defined as a set of equidistantly spaced points as shown in FIG. 2a, or as a set of points more densely concentrated around some predefined set of input values. Specifically, FIG. 2a depicts a two-dimensional input space traversal on a full grid, according to one embodiment of the disclosure. In this case, the total number of grid points scales exponentially with the number of input dimensions, which could be prohibitive for high-dimensional input spaces. In order to overcome this issue, in some embodiments, a predefined number of points can be randomly sampled from the full grid to form the test bench, according to some predefined procedure, such as Simple Random Sampling (SRS) or Latin-Hypercube-Sampling (LHS), to form the set of input values to be utilized within the reference dataset. Alternately, in other embodiments, sparse-grids as shown in FIG. 2b, which require a significantly smaller number of points to reach the same order of approximation of the circuit function, as compared to the full grid approach can be generated using sophisticated mathematical techniques to form the test bench.

In some embodiments, the reference dataset determination module 114 is configured to utilize the test bench, in order to generate the reference dataset D. In some embodiments, the reference dataset determination module 114 may be configured to perform simulations of the ground truth representation of the modelled/target circuit block based on the test bench, to generate the reference dataset. Alternately, in other embodiments, the reference dataset determination module 114 may be configured to generate the reference dataset D, based on laboratory measurements performed on the ground truth representation of the modelled circuit block using the determined test bench. In such embodiments, the reference dataset determination module 114 may be configured to receive the laboratory measurements from an external storage medium or an end user. In some embodiments, the generated reference dataset D comprises a set of data values. In some embodiments, the set of data values within the reference dataset D comprises the set of input values within the test bench and a corresponding set of output values/output parameters generated based on the simulation/laboratory measurements of the target circuit block based on the test bench.

In some embodiments, the reference dataset determination module 114 is further configured to provide the reference dataset D to the data storage module 118 where the reference dataset D is stored. In some embodiments, the reference dataset is processed/transformed into a desirable format using the data processing module 116, prior to storing the reference dataset D in the data storage module 118. For example, if the reference dataset D comprises frequency domain data, but the model (i.e., the FAAM) shall be used in time-domain simulations, the data processing module 116 may be configured to inverse-Fourier transform the data values within the reference dataset D, before providing the reference dataset D to the data storage module 118. Further, if the data associated with the modelled/target circuit block comes from laboratory measurements, the data values within the reference dataset D may be noisy and could also have missing data points. In such embodiments, the data processing module 116 may be configured to de-noise the data and input the missing values, prior to storing the reference dataset D in the data storage module 118.

Referring back to FIG. 1a, once the reference dataset D is generated, the FAAM builder module 104 is configured to generate a FAAM of the modelled circuit block based on the generated reference dataset. Particularly, the FAAM builder module 104 comprises a model construction module 106 configured to generate the FAAM for the modelled/target circuit block, based on the generated reference dataset D. In some embodiments, a FAAM approximates the input to output relationship of the modelled/target circuit block that is defined by the set of data values in the reference dataset. In some embodiments, the model construction module 106 is configured to receive the reference dataset D, in order to generate the FAAM. In some embodiments, the data generation module 102 and the FAAM builder module 104 may be included on a same computing environment. In such embodiments, the model construction module 106 may be configured to receive the reference dataset D directly from the data storage module 118 associated with the data generation module 102. Alternately, in other embodiments, when the data generation module 102 and the FAAM builder module 104 are included on different computing environments, the model construction module 106 may be configured to receive the reference dataset D from an end-user or from a memory module associated therewith (where the reference dataset D is stored). The model construction module 106 may be configured to generate the FAAM utilizing the reference dataset D, based on a semi-automated process or a fully automated process.

Figure 3A:
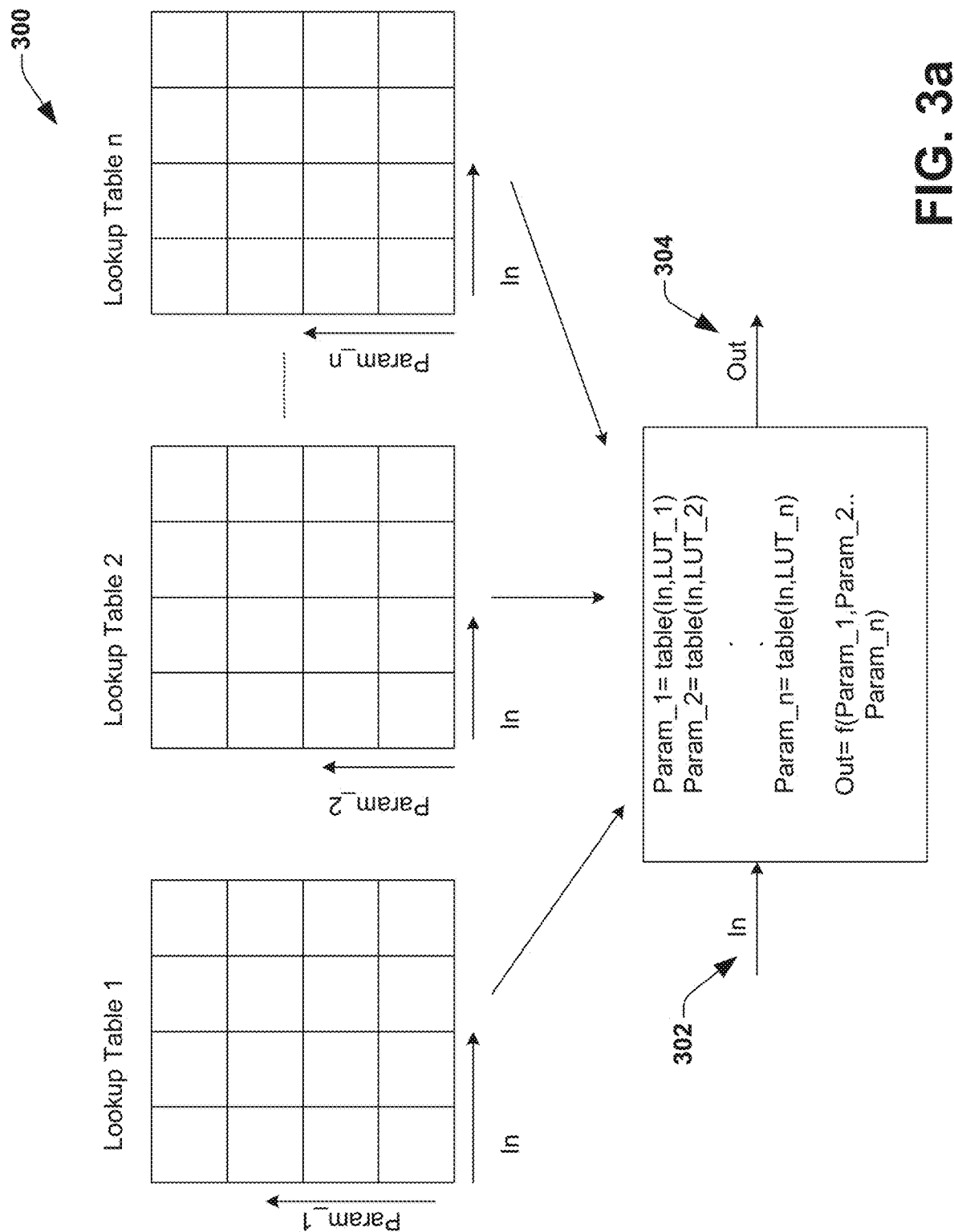
FIG. 3a depicts a fault aware analog model (FAAM) comprising one or more lookup tables, according to one embodiment of the disclosure.

In one embodiment, the model construction module 106 is configured to generate the FAAM based on the reference dataset, in accordance with a lookup table approach. Specifically, in the lookup table approach, the model construction module 106 is configured to append a nominal model/nominal hand-written model (as defined earlier) of the modelled circuit block with one or more lookup tables (LUTs) (e.g., the Lookup Table 1, Lookup Table 2 . . . the Lookup Table n in FIG. 3a) derived based on the reference dataset D to form the FAAM 300, as shown in FIG. 3a. In some embodiments, appending the nominal model/nominal hand-written model with the LUTs enables to extend the nominal models/nominal hand-written models with out-of-spec behavior of the modelled circuit block. In other words, appending the nominal model/nominal hand-written model with the LUTs enables the nominal models/nominal hand-written models to give a correct circuit response during both in-spec and out of spec operation of the modelled circuit block. In some aspects, hardware description languages (HDL), such as Verilog-A, allow the inclusion of a lookup table in the model. In some embodiments, the nominal model/the nominal hand-written model of the modelled circuit block/target circuit block comprises a mathematical relation/function of a set of circuit parameters of the modelled circuit block. In some embodiments, the set of circuit parameters comprise a set of input parameters and a set of output parameters/outputs of the modelled circuit block. In some aspects, an output of the nominal model/the nominal hand-written model is derived based on the set of input parameters and/or the set of output parameters. In some embodiments, the reference dataset includes all possible values (both in-spec and out-of-spec values) of the input parameters and the corresponding output parameters/outputs. In some embodiments, each LUT of the one or more LUTs (derived based on the reference dataset) is derived to include information on a variation of values of one or more output parameters (e.g., Param_1, Param_2 etc.) of the nominal model/the nominal hand-written model for one or more input parameters (e.g., In in FIG. 3a) of the nominal model/the nominal hand-written model. Therefore, when the FAAM 300 is presented with an input stimuli In 302 (which corresponds to the input parameters), corresponding output parameters (Param_1, Param_2 etc.) are read from the LUTs and the output Out 304 of the FAAM 300 is generated based on the nominal model/the nominal hand-written model, as a function of the output parameters read from the LUTs (i.e., Out=f(Param_1,Param_2 . . . Param)). In other words, the output Out 304 of the FAAM 300 is derived based on the nominal model/the nominal hand-written model, but the value of the output parameters used in the nominal model/the nominal hand-written model is read from the corresponding LUT, in accordance with the input stimuli In 302.

Figure 3B:
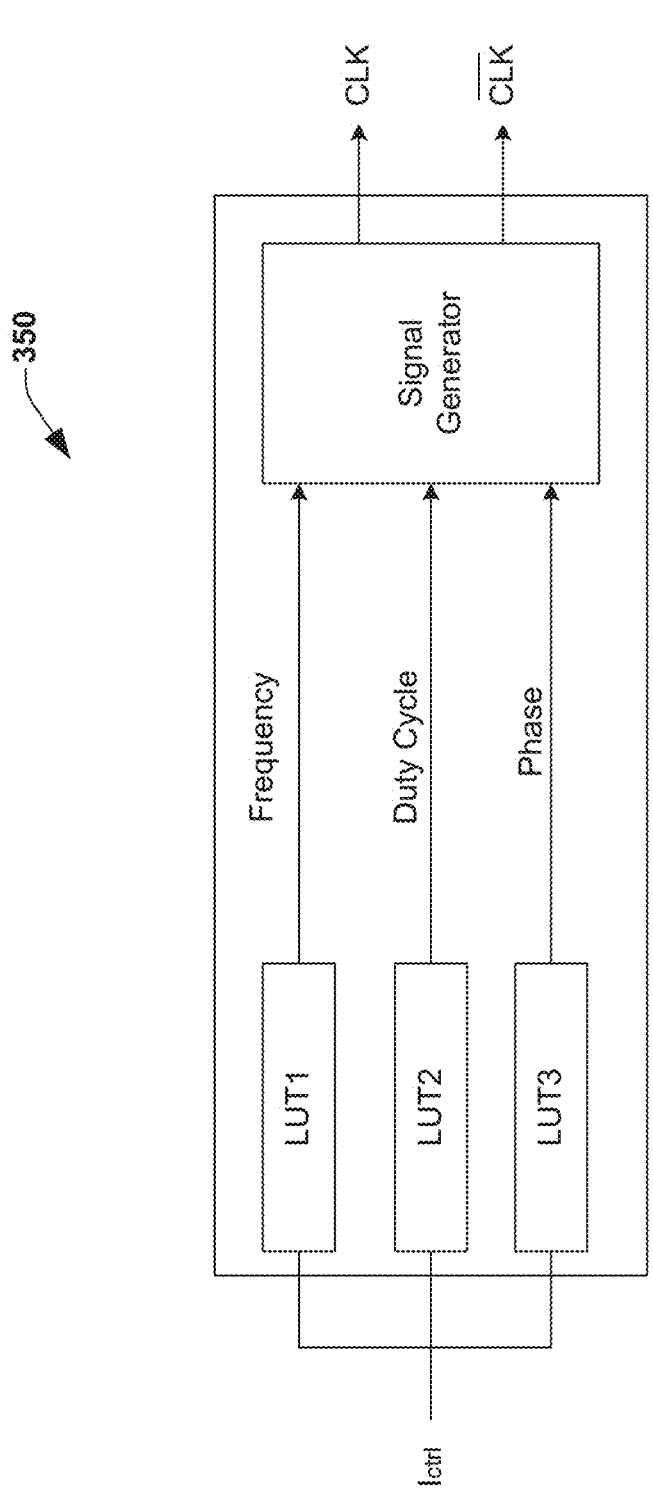
FIG. 3b shows a FAAM of an oscillator modelled using lookup table (LUT) method, according to one embodiment of the disclosure.

FIG. 3b shows the FAAM 350 of an oscillator modelled using the LUT method described above. The output of the oscillator is the clock signal CLK and its inversion $\overline{CLK}$. The output of the oscillator is derived based on the output parameters frequency, duty cycle and phase, in accordance with a nominal model/the nominal hand-written model of the oscillator. The input of the oscillator is the biasing current. The LUT1 gives the variation of the frequency for all possible values of the biasing current, LUT2 gives the variation of the duty cycle for all possible values of the biasing current and LUT3 gives the variation of the phase for all possible values of the biasing current. Therefore, the output of the oscillator is derived based on the nominal model/the nominal hand-written model, with the values of the frequency, duty cycle and phase chosen from the LUT1, LUT2 and LUT 3, respectively.

Figure 4:
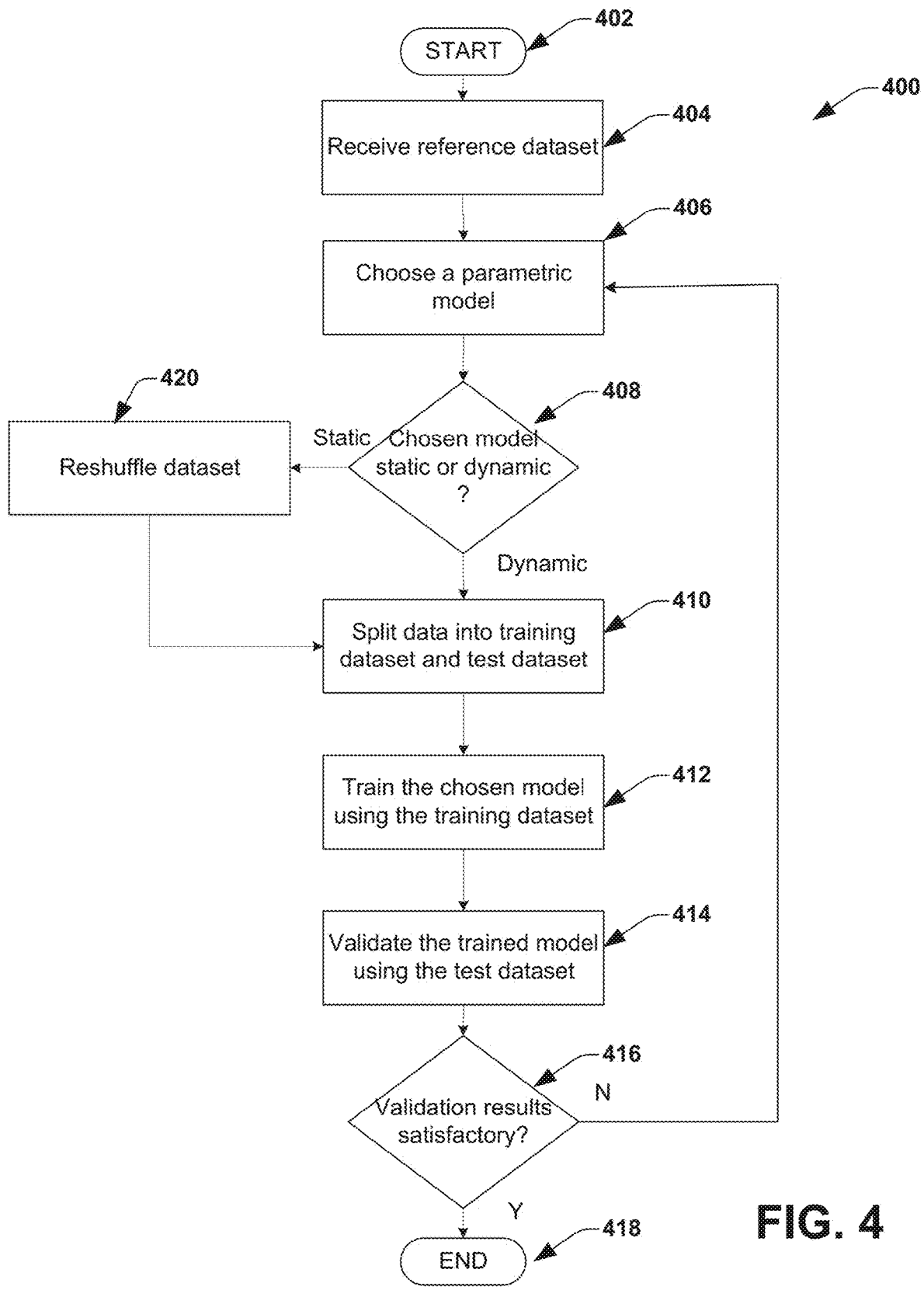
FIG. 4 depicts an algorithm for generating a FAAM based on the machine learning approach, according to one embodiment of the disclosure.

Alternately, in another embodiment, the model construction module 106 is configured to generate the FAAM, in accordance with a machine learning approach. Specifically, in the machine learning approach, the model construction module 106 is configured to choose a parametric model comprising a plurality of model parameters and train/fit the chosen parametric model using the reference dataset D to form the FAAM. FIG. 4 depicts an algorithm 400 for generating the FAAM based on the machine learning approach within the model construction module 106. At 402, the algorithm 400 for generating the FAAM begins. At 404, a reference dataset D is received at the model construction module 106. In some embodiments, the reference dataset D comprises the reference dataset generated at the data generation module 102. In some embodiments, the reference dataset D is received at the model construction module 106 from the data storage module 118 associated with the data generation module 102. Alternately, in other embodiments, the reference dataset D may be received at the model construction module 106 externally from an end-user (e.g., from an external storage medium) and saved into a memory module associated therewith.

At 406, a parametric model $f_\theta$: A→B to be utilized to generate the FAAM is selected/determined at the model construction module 106. The parametric model is a model that comprises a plurality of model parameters and should contain sufficient degrees of freedom (or model parameters) to be adjusted in order to be able to match the full behavior of the modelled circuit block. Generally, the parametric model is not constructed based on physical assumptions and laws, but is rather fitted/trained based on the generated reference dataset, so that it represents the reference dataset as well as possible. Specifically, the plurality of model parameters is modified/trained based on the reference dataset, in order for the parametric model to approximate the input-output relationship defined by the reference dataset. In some embodiments, the parametric model may be chosen from predefined libraries comprising a plurality of parametric models, for example, from machine learning libraries like Google's TensorFlow. Alternately, in other embodiments, the parametric model may be constructed from scratch, based on a set of well-defined mathematical relationships (for example, with the aid of the predefined libraries). The parametric model and model parameters associated therewith are independent of the circuit block to be modelled.

The selected/constructed parametric models could range from simple multi-variate polynomials to complex artificial neural networks with recurrent structure. At this stage, not only classical, deterministic behavior models are envisaged, but also the construction of probabilistic/stochastic models where, given some inputs, the model outputs not only the predicted value, but also the uncertainty in that prediction in the form of a standard deviation or another metric. Examples for such models are, Bayesian neural networks, variational auto-encoders, as well as more traditional methods such as Gaussian regression models and others. It shall be noted that such capability of a FAAM to output both a prediction and the uncertainty about this prediction may be valuable in the context of ADS, since this can be used to issue out a warning when the model is about to make an erroneous prediction. The parametric model is chosen depending on the desired application of the FAAM and the richness of the underlying data in the reference dataset. In some embodiments, the parametric model is selected at the model construction module 106, based on information provided by an end-user.

Upon the selection of the parametric model, at 408, a determination whether the selected parametric model is a dynamic model or a static model is made at the model construction module 106. In case of dynamic models, the output of the model depends on past values of the input stimuli whereas for static models the order of model evaluation does not affect the end result. For this reason, for dynamic models, which are typically useful for time-series regression, the ordering of the reference dataset D might need to be preserved before using this data in the model training stage. In contrast, for static models the reference dataset D may be randomly shuffled (but does not need), prior to using it for training. Therefore, based on the determination at 408, if the selected parametric model comprises a dynamic model, the algorithm proceeds to 410, where the reference dataset D is split into at least a training dataset $D_{trn}$ and a test dataset $D_{tst}$. Whereas if the selected parametric model comprises a static model, the algorithm may proceed to 420, where the reference dataset D is reshuffled, before proceeding to 410. Alternately, even when the chosen parametric model comprises a static model, the algorithm may not reshuffle the reference dataset D and may proceed directly to 410, where the reference dataset is split into at least the training dataset $D_{trn}$ and the test dataset $D_{tst}$.

In some embodiments, the training dataset $D_{trn}$ comprises a set of training data values to be utilized to train the chosen parametric model to form a trained parametric model or an optimized parametric model. Specifically, the set of training data values within the training dataset $D_{trn}$ comprises data values drawn from the reference dataset D, which is used for adjusting the parameters of the parametric model $f_\theta$: A→B. Typically, the training dataset $D_{trn}$ amount to between 70% to 90% of the full reference dataset D. In some embodiments, the set of training data values $D_{trn}$ within the training dataset $D_{trn}$ comprises a set of input values and a set of output values associated with the modelled circuit block (i.e., the circuit block to be modelled to form the FAAM). In some embodiments, the test dataset $D_{tst}$ comprises a set of test data values to be utilized to validate the trained parametric model. In some embodiments, the set of test data values within the test dataset $D_{tst}$ comprises data values drawn from the reference dataset D, which are used for validating how well the parametric model, $f_\theta$: A→B, satisfies some pre-defined criterion. In order to deliver an unbiased estimate on the performance of the trained parametric model, in some embodiments, the training dataset $D_{trn}$ and the test dataset $D_{tst}$ comprise disjoint datasets. In other words, in some embodiments, the set of training data values in the training dataset $D_{trn}$ and the set of test data values in the test dataset $D_{tst}$ are different. Typically, the test data values amount to from 10% to 30% of the full reference dataset.

Once the training dataset $D_{trn}$ and the test dataset $D_{tst}$ are generated, the chosen parametric model $f_\theta$: A→B is trained using the training dataset $D_{trn}$ at 412, to form an optimized parametric model/trained parametric model $f_{\theta*}$. Specifically, the plurality of model parameters associated with the selected parametric model $f_\theta$: A→B are modified/fitted/trained using the training dataset $D_{trn}$ to form a plurality of optimized model parameters that accurately represent the input output relationship of the reference dataset D (specifically, the training dataset $D_{trn}$). In order to train the chosen parametric model with the reference dataset D, in some embodiments, the model construction module 106 is configured to define an optimization problem, where a goodness of fit function is constructed to capture the "goodness-of-fit" of the model/model parameters (to characterize which parameters are a good fit).

For example, in some embodiments, the goodness of fit function may comprise a loss function L. In some embodiments, the loss function L comprises a mathematical function L:B→$\mathbb{R}$ used to quantify how well a given model approximates the input-output relationships in the reference dataset D. In this context, a large loss means a bad fit, whereas a small value of the loss function is intended to mean a good fit. Given a data point (X, Y) in the reference dataset D (specifically, the training dataset $D_{trn}$), a typical example for a loss function could be, e.g. $|f_\theta(X)-Y|$, the deviation of the model output from the target value, or $-\log \text{Prob}_{f_\theta}(Y|X, \theta)$ the negative log probability of the model $f_\theta$ to output the target Y, conditioned on the inputs X and the parameters θ and so on. Having so formulated the mathematical problem, a loss-minimization algorithm/optimization is employed to find the plurality of optimal model parameters. This could be a gradient based optimizer, or a heuristic optimization technique such as genetic algorithms, simulated annealing, greedy search etc. Alternately, in other embodiments, the optimization problem may be defined differently, for example, as a gain/utility function maximization task. In such embodiments, the goodness of fit function may comprise a gain function instead of the loss function L. During the model training stage, additional measures may be taken to ensure that the data-driven FAAM to be generated does not underfit/overfit, but generalizes well to 'unseen' datapoints. This can be done by extending the goodness of fit function (e.g., the loss function), with additional terms which impose a penalty on non-regular model parameters, or by introducing sufficient amount of noise in the training dataset, prior to solving the optimization problem. Here standard 'regularization' methods such as L1/L2 . . . /Lp regularization, drop-out and other techniques can all be employed to ensure that the model $f_\theta$ learns the actual data generation process.

Once the optimized parametric model $f_{\theta*}$ is generated, the model construction module 106 is further configured to validate the optimized parametric model $f_{\theta*}$, at 414, to determine whether the optimized parametric model $f_{\theta*}$ is satisfactory. In some embodiments, the model construction module 106 is configured to validate the optimized parametric model $f_{\theta*}$, based on the test dataset $D_{tst}$. In some embodiments, the optimized parametric model is validated, in order to determine whether the optimized parametric model provides a good approximation of the ground truth for both in and out of specification stimuli. In some embodiments, the model construction module 106 is configured to validate the optimized parametric model based on an error function (which can, but need not, be the same as the loss function) which calculates an approximation error made by the output values provided by the optimized parametric model, given some input data X. Here the approximation error of the optimal parametric model $f_{\theta*}$ is calculated using the test dataset $D_{tst}$.

Specifically, the approximation error comprises an error in the output values provided by the optimized parametric model $f_{\theta*}$ with respect to corresponding output values in the test dataset $D_{tst}$, when the optimized parametric model $f_{\theta*}$ is provided with the set of input values in the test dataset $D_{tst}$. When the approximation error is lesser than or equal to a predefined validation threshold, the optimized parametric model is identified as satisfactory, thereby forming the FAAM. In other words, when the approximation error is lesser than or equal to the predefined validation threshold, the optimized parametric model $f_{\theta*}$ is chosen as the FAAM. However, when the approximation error is greater than the predefined validation threshold, the optimized parametric model $f_{\theta*}$ is identified as unsatisfactory. In such embodiments, the model construction module 106 is configured to iteratively generate one or more updated optimized parametric models based on updating the reference dataset or based on updating the parametric model, until the approximation error associated with an updated optimized parametric model is lesser than or equal to the predefined validation threshold, in order to form the FAAM. In other words, the algorithm 400 is repeated iteratively either based on choosing a different parametric model at 406 or based on using a different reference dataset at 404, until satisfactory validation results are obtained at 416. Upon generating the FAAM, the algorithm 400 ends at 416.

Referring back to FIG. 1*a*, the FAAM builder module 104 further comprises a model deployment module 108 configured to convert the generated FAAM into a deployable format, in order to deploy the FAAM into a simulator environment (e.g., analog mixed signal (AMS) context) where the FAAM is to be simulated. Specifically, the model deployment module 108 is configured to convert the generated FAAM (for example, generated within the model construction module 106) into the deployable format, prior to providing the FAAM to the simulator environment. In some embodiments, the FAAM is implemented in a hardware description language (HDL) like Verilog-A, either by hand written implementation or by code generation, in order to deploy the FAAM into the AMS environment. Direct implementation of the FAAM in HDL, however, suffers from the drawback that it does not scale, is prone to human error, and produces models which are not portable between different stages of the system implementation cycle (e.g. a Verilog-A embodiment would not be executable in a system level environment, e.g. Matlab+Simulink).

Therefore, in some embodiments, the FAAM is converted into the deployable format by serializing the FAAM into a computer readable format in order to store the FAAM to a non-transitory computer readable storage medium. In some embodiments, serializing the FAAM into the computer readable format comprises saving the model representation to a computer file, which is compact enough but yet contains full information which can be used to reliably reconstruct the model. Having the capability to serialize the model, will ensure the portability of the model across different development workflows, and its usability within different simulation environments. In some embodiments, the model serialization (i.e., the serialized FAAM) is compatible with machine learning libraries, such as TensorFlow, pytorch, H2O etc. and can be imported to, modified by and exported from high-level computer programming languages, such as python, R, C++, JAVA, GO and so on. This enables creation of state-of-the-art machine learning models (e.g., FAAM) irrespective of the AMS simulation environment, in an 'offline' stage, i.e. without having to run an analog simulator to verify the correctness the model.

Figure 5:
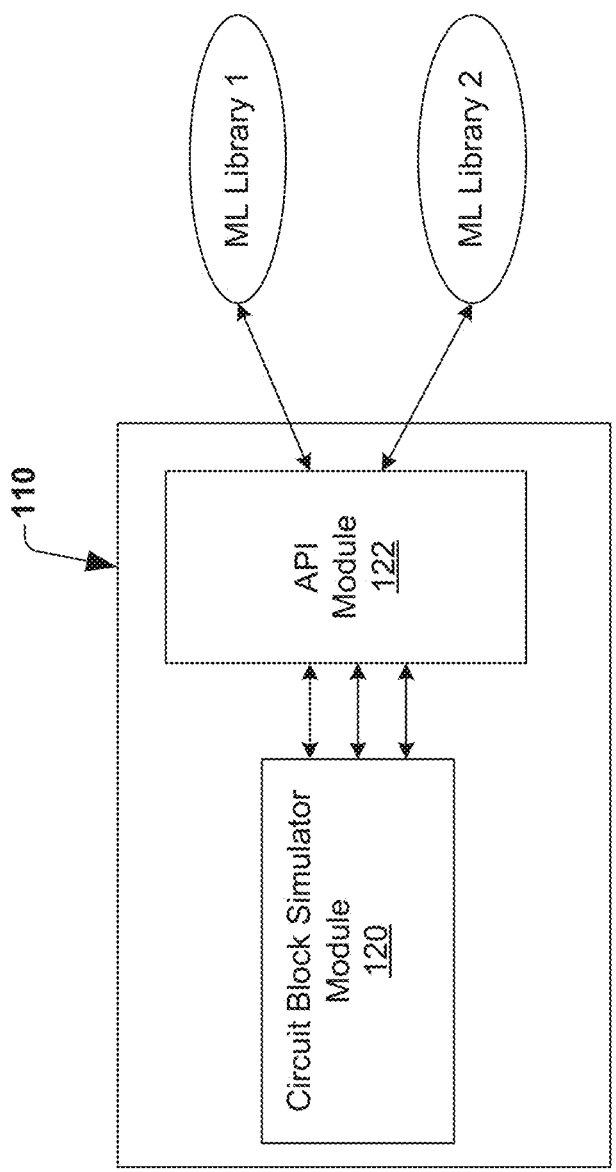
FIG. 5 illustrates a simplified block diagram of a simulator module, according to one embodiment of the disclosure.

Referring back to FIG. 1*a*, the FAAM system 100 further comprises a simulator module 110 (e.g., an analog circuit simulator) configured to simulate the FAAM. In other embodiments, however, the simulator module 110 may be configured to simulate any other behavioral model, different from the FAAM and/or ground truth representations of a circuit block. In some embodiments, the simulator module 110 comprises a circuit block simulator module 120 configured to simulate the received behavioral models, for example, the FAAM, as shown in FIG. 5. In some embodiments, the circuit block simulator module 120 is configured to receive the FAAM generated at the model construction module 106 or the deployable version of the FAAM generated at the model deployment module 108, in order to perform simulations of the FAAM. In some embodiments, the behavioral models/FAAM is stored/saved in a memory module associated with the circuit block simulator module 120, prior to simulating the behavioral models/FAAM. In some embodiments, the simulator module 110 and the FAAM builder module 104 may be part of a same computing environment or computer. Alternately, in other embodiments, the simulator module 110 and the FAAM builder module 104 may be part of different computing environment or computers. In some embodiments, the simulator module 110, in particular, the circuit block simulator module 120 is coupled to one or more machine learning libraries, for example, Google's TensorFlow. In some embodiments, coupling the circuit block simulator module 120 to one or more machine learning libraries (e.g., ML Library 1 and ML Library 2 in FIG. 5) enables the circuit block simulator module 120 to load and execute behavioral models (e.g., the serialized FAAM) compatible with the one or more machine learning libraries, which are not otherwise supported by/compatible with the simulator environment (i.e., the circuit block simulator module 120).

In some embodiments, the circuit block simulator module 120 is coupled to one or more machine learning libraries via a simple extension of a hardware description language interface. Specifically, the circuit block simulator module 120 is coupled to the one or more machine learning libraries, via an application program interface (API) module/API. In such embodiments, the simulator module 110 further comprises an API interface module 122 configured to couple the circuit block simulator module 120 to one or more machine learning libraries. The API comprises a computing interface/functions which define interactions between multiple software intermediaries. In some embodiments, the API module 122 is implemented using any hardware description language, for example, Verilog-A. The developed API, among other things, allows both the loading and execution of models (e.g., the serialized FAAM) associated with one or more machine learning libraries, for example TensorFlow. An illustration of one possible implementation of the envisaged API, accomplished by an extension of the Verilog-A HDL to couple with Google's TensorFlow machine learning library, is presented in Listing 1 below.

/***
* Example implementation of FAAM loading and evaluation in Verilog-A syntax
**/module
module FAAM_model (np,nn);
  input np, nn;
  electrical np, nn;
  integer model_id;
  analog initial begin
    // load the model from file, adding some flags in the process,
    // and return an integer that uniquely identifies the model inside
    // this Verilog-A module.
    model_id=$model_load ("model.pb", flags . . . );
  end
  analog begin
    // do some other calculations
    . . .
    // evaluate FAAM, by telling the API which model to evaluate and also
    // providing it with the model inputs.
    I(np,nn)<−1. $model_evaluate (model_id, V(pin, nn));
  end
endmodule
Listing 1: Example syntax of Verilog-A to TensorFlow binding.

The above listing uses several Verilog-A system functions as the API. The first one, via the $model_load ("model.pb", . . . ), takes care of loading the model from a file (e.g., model.pb) and transforming it from a serialized representation to one ready to be executed with subsequent API calls. Upon successful completion, this routine returns a non-negative integer, uniquely identifying the model within this simulation run, and the model is ready to be executed in a consecutive step. In the above example, in the main analog block of the module, another API call, $model_evaluate (model_id, V(pin,nin)), evaluates the model, by providing the function with the model id and the desired input at the current stage of this simulation. In this particular example, the input of the model is assumed to be the voltage across the module terminals, whereas the output is the corresponding current.

Referring back to FIG. 1a, in some embodiments, the simulator module 110 is further configured to test the FAAM/serialized FAAM for correctness and implementation errors, i.e. the deployed FAAM model is simulated in the actual production environment to verify whether circuit simulator effects, such as for example time-stepping, various Newton convergence strategies and others, will have an impact on the computed results. In addition, here the model stability properties are also investigated, where stability is defined as the sensitivity of the model to small variations in the input stimuli. In some embodiments, model testing ensures that the model performs as expected in its deployment environment. Two properties of the model are investigated: delivery of correct results as compared to some benchmark data, and robustness of the model against circuit simulator effects and stability of the model in the face of small variation in the input stimuli.

Figure 6A:
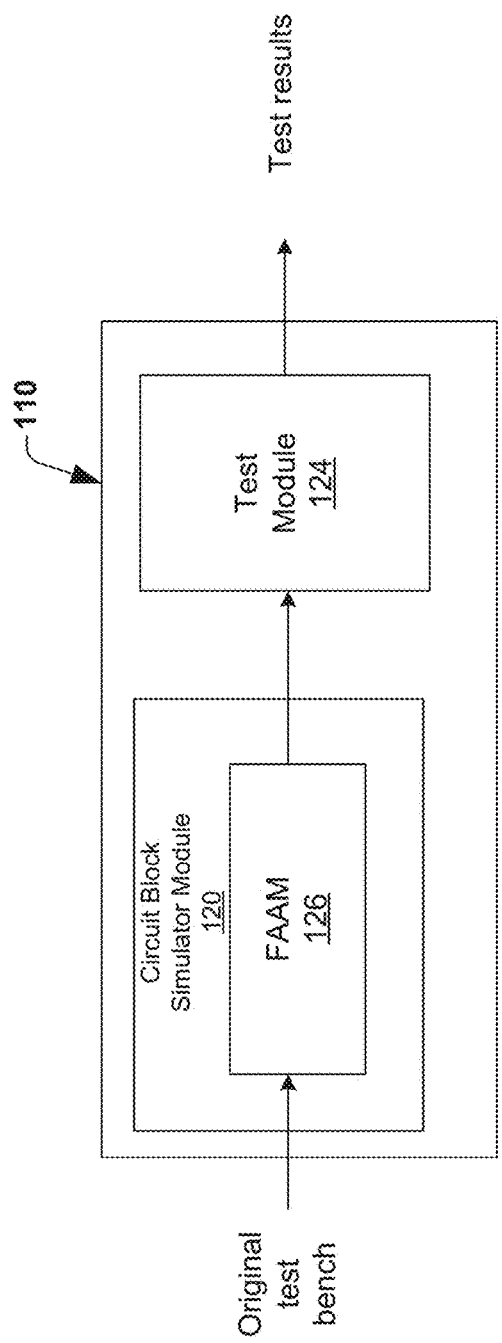
FIGS. 6a and 6b illustrates simplified block diagrams of a simulator module comprising a test module, according to one embodiment of the disclosure.

In order to test the FAAM, in a first embodiment, the circuit block simulator module 120 is configured to simulate the FAAM, based on an original test bench comprising a set of input values (input stimuli) utilized during the data generation stage, as shown in FIG. 6a. Specifically, the original test bench comprises the set of input values associated with the reference dataset D (generated by the data generation module 102) associated with the FAAM. In some embodiments, the simulator module 110 further comprises a test module 124 coupled to the circuit block simulator module 120, and configured to compare simulation results obtained based on simulating the FAAM with the original test bench and the original responses (e.g., the set of output values within the reference dataset D obtained based on simulating the ground truth associated with the FAAM) to generate comparison results (or a comparison error). In some embodiments, the comparison results are indicative of a deviation of the FAAM from the ground truth. In some embodiments, the test module 124 is further configured to determine if the comparison error is within some predefined error limits, in order to determine if the deployed FAAM is satisfactory (provided by the test results). In some embodiments, the test module 124 is implemented in a hardware description language (HDL), for example, Verilog-A. In some embodiments, error metrics, for example, error thresholds are defined to determine if the comparison results/errors are satisfactory or not. In some embodiments, the simulation of the FAAM with the original test bench is repeated for different simulator settings, such as the error tolerance, maximum allowed time step, integration method and/or non-linear equation solution approach. In such embodiments, the test module 124 is configured to determine if the comparison results are within some predefined error limits, over the total number of simulations. In some embodiments, the test results are stored within a memory module associated with the simulator module 110.

Figure 6B:
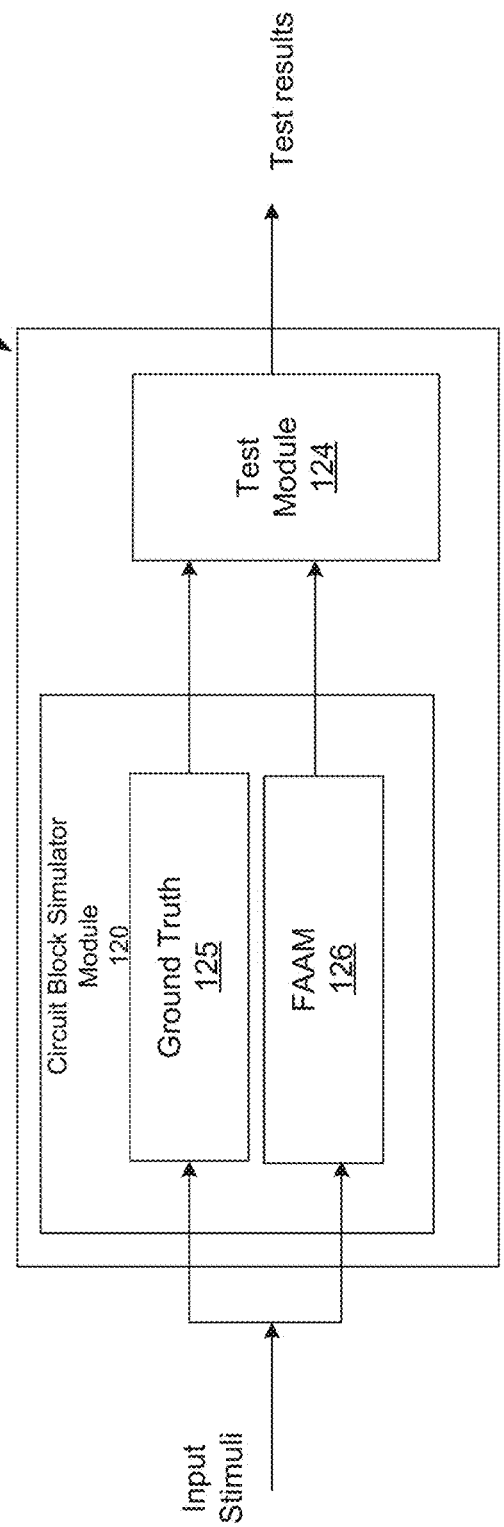

Alternately, in another embodiment, in order to test the FAAM, the circuit block simulator module 120 is configured to simulate both the serialized FAAM and its associated ground truth, based on a same predefined test bench comprising a set of input values (input stimuli), as shown in FIG. 6b. In such embodiments, the test module 124 is configured to compare the simulation results of both the serialized FAAM and the ground truth, and generate comparison results/errors based thereon. In some embodiments, the comparison results are indicative of a deviation of the FAAM from the ground truth. In some embodiments, the test module 124 is further configured to determine if the comparison error is within some predefined error limits, in order to determine if the deployed FAAM is satisfactory (provided by the test results). In some embodiments, the simulation of both the serialized FAAM and its associated ground truth is repeated for different simulator settings, such as the error tolerance, maximum allowed time step, integration method and/or non-linear equation solution approach. In such embodiments, the test module 124 is configured to determine if the comparison results are within some predefined error limits, over the total number of simulations. In some embodiments, the test results are stored within a memory module associated with the simulator module 110.

Figure 7A:
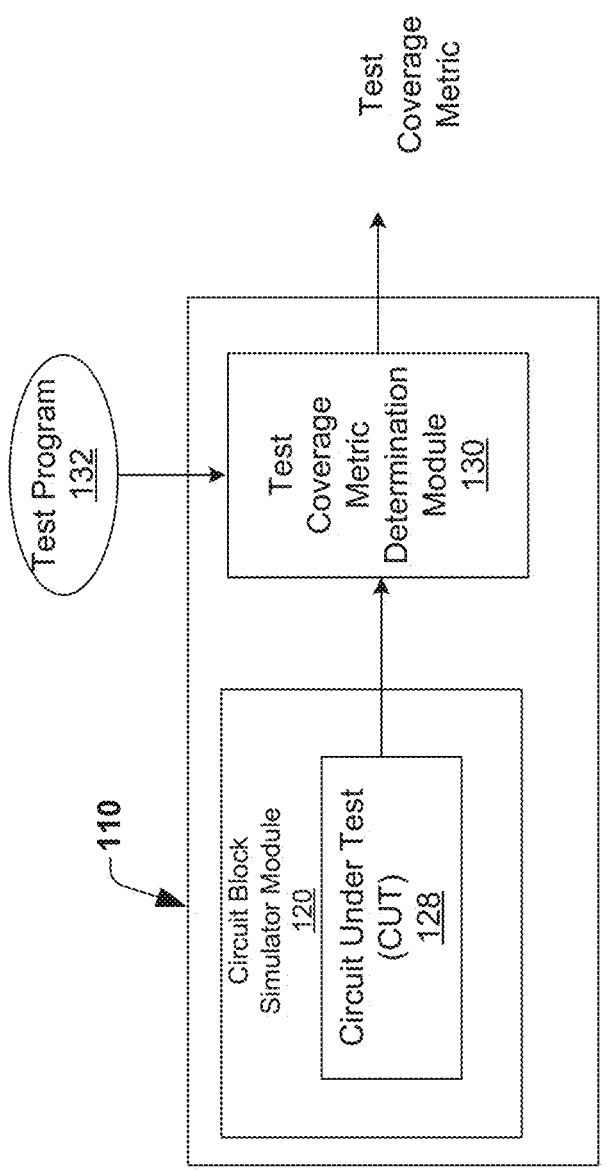
FIG. 7a illustrates a simplified block diagram of a simulator module configured to perform test coverage metric determination, according to one embodiment of the disclosure.
Figure 7B:
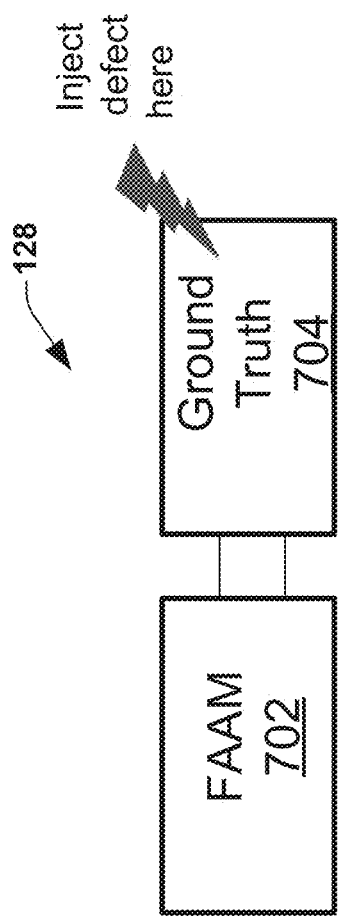
FIG. 7b illustrates a circuit under test (CUT) comprising a FAAM to be utilized for performing analog defect simulations (ADS), according to one embodiment of the disclosure.

Referring back to FIG. 1a, in some embodiments, the simulator module 110 is further configured to perform analog defect simulations (ADS). Specifically, the circuit block simulator module 120 is configured to perform ADS on a circuit under test (CUT) 128, as shown in FIG. 7a. The CUT 120 comprises a plurality of circuit blocks as shown in FIG. 7b. Specifically, at least one circuit block of the CUT 128 comprises a FAAM circuit block 702 implemented using fault aware analog model (FAAM). Further, at least one circuit block of the CUT 128 comprises a ground truth circuit block 704 implemented in its ground truth representation. In some embodiments, the ADS simulation of the CUT 128 is performed based on injecting defects into the ground truth circuit block 704. In some embodiments, defects are injected into the ground truth circuit block 704 based on methods described in the IEEE P2427 standard.

In some embodiments, the simulator module 110 further comprises a test coverage metric determination module 130 configured to determine a test coverage metric of a test program 132, by executing the test program 132 based on the ADS performed on the CUT 128. The test coverage metric of a test program measures the overall capability of the test program to find defects in a circuit (e.g., the CUT 128). In some embodiments, the test coverage metric determination module 130 is configured to determine a FAAM test coverage metric that defines a probability that the test program 132 fails when there is a defect in the CUT 128. In some embodiments, the FAAM test coverage metric may be determined at the test coverage metric determination module 130 as the number of defects detected by the test program 132 during the ADS performed on the CUT 128 divided by a total number of defects simulated during the ADS of the CUT 128. However, the FAAM test coverage metric may be different from an original test coverage metric determined by executing the test program 132 based on the ADS simulation of an original circuit associated with the CUT 128. In some embodiments, the original circuit corresponds to a circuit when each circuit block within the CUT 128 is implemented using a corresponding ground truth representation. In some embodiments, the original test coverage defines a probability that the test program fails when there is a defect in an original circuit associated with the CUT 128. In some embodiments, the original test coverage metric is the one that is required by industry/customer. Therefore, in some embodiments, it is necessary to determine the original test coverage metric based on the ADS performed on the CUT 128.

Therefore, a method to enable the test coverage metric determination module 130 to determine the original test coverage metric based on the ADS performed on the CUT 128 is described below. Specifically, FIG. 8a depicts an original circuit 800 comprising all circuit blocks implemented in the ground truth representation. Further, FIG. 8b depicts a FAAM circuit (e.g., the CUT 128 in FIG. 7a) wherein the ground truth block A of the original circuit 800 is replaced by its FAAM B. In some embodiments, a test T asserts whether a measurable quantity of the circuit, e.g. V(out), belongs to a range [a; b], with the test passing if V(out)∈[a; b] and failing otherwise. Let us assume that ADS simulation with the original circuit 800 produced the value z for V(out), whereas the same ADS simulation with the FAAM circuit 850 produces the value y for V(out), which is in general a different number than z, i.e. y≠z. Given this setting, for the original circuit 800, the following probabilities can be outlined:

True negative: Test FAILs, given that there was a defect in the circuit. The probability of this "event" can be written as $\alpha = Pr(a>z \text{ or } b<z|\text{defect})$.

False positive: Test PASSes, given that there was a defect in the circuit. The probability of this "event" can be written as $\beta = Pr(a<z<b|\text{defect})$.

Please note that the true negative is namely the "test coverage metric" of a test T. Specifically, $\alpha$ comprises the original test coverage metric derived based on ADS simulations performed on the original circuit 800. When using FAAMs, since simulations are not performed on the original circuit 800, but rather on the FAAM circuit 850, only FAAM test coverage metric $\hat{\alpha}=Pr(a>y \text{ or } b<y|\text{defect})$ and $\hat{\beta}=Pr(a\leq y\leq b|\text{defect})$ can be measured. So, in order to deliver the original test coverage metrics, an estimate for $\alpha$ needs to be computed, based on simulations of the FAAM circuit 850 (because $\alpha$ is the original test-coverage metric the industry/customer will need to know). Out of mathematical convenience, a procedure for the computation of an estimate of $\beta$ is outlined, which can then be used to compute a, using the relation $\alpha = 1-\beta$.

If it is assumed that the defects are injected at random, then the result V(out) will also be a random variable, which has some distribution. Introducing some additional notation:

Assume that Z is the output of V(out) of the original circuit 800, which is a random variable with cumulative distribution function (cdf) $F_Z(z)=Pr(Z\leq z|\text{defect})$. In addition, $p_Z(z)=dF_Z(z)/dz$ defines the probability density function (pdf) of Z.

Assume that Y is the output of V(out) of the FAAM circuit 850, which is a random variable with cumulative distribution function (cdf) $F_Y(y)=Pr(Y\leq y|\text{defect})$. In addition, $p_Y(y)=dF_Y(y)/dy$ defines the probability density function (pdf) of Y.

Using this notation, $\beta=1-\alpha$ can be written as $$\beta = Pr(a \leq Z \leq b \mid \text{defect}) = \int_a^b dF_Z(z) = \int_a^b p_Z(z)dz. \quad (1)$$

From Bayes' theorem, it holds that $$p_Z(z)dz \approx \int_{-\infty}^{\infty} Pr(Z \in [z; z+dz] \mid Y \in [y; y+dy], \text{defect}) p_Y(y) dy. \quad (2)$$

This expression relates the pdf of Z to the pdf of Y and the conditional probability of Z, given that the FAAM model output Y=y and that there was the same defect in both the original circuit 800 and the FAAM circuit 850. Now, based on the assumption that given Y, the events that Z=z and that there is a defect in the circuit are independent (which is called conditional independence and in mathematical notation is written out as Z⊥defect|Y), expression (2) is simplified as $$p_Z(z)dz \approx \int_{-\infty}^{\infty} Pr(Z \in [z; z+dz] \mid Y \in [y; y+dy]) p_Y(y) dy. \quad (3)$$

This is reasonable to assume, since the output of the FAAM is by construction close to the output of the reference circuit (i.e., the ground truth). Thus, knowledge about the value of Y (given the same inputs) is a better predictor about the value of Z, than whether or not there was a defect in the circuit. In equation (3) above, $Pr(Z \in [z; z+dz] \mid Y \in [y; y+dy])$ gives the probability that the value of Z lies in the interval [z; z+dz], given that Y lies in the interval [y; y+dy]. Further, $p_Y(y)$ denotes the probability that the FAAM circuit 850 will return a value in the interval [y; y+dy], given that there was a particular defect in the FAAM circuit. In this simplified form, the equation (3) can be estimated from two datasets. The first term $Pr(Z \in [z; z+dz] \mid Y \in [y; y+dy])$ in the integrand is estimated from the reference dataset D and the results of the model training, validation and testing procedures. Specifically, Z corresponds to the set of output values in the reference dataset D (determined during the data generation stage within the data generation module 102) and Y corresponds to the set of output values obtained from the FAAM during the model training, validation and training procedures. Further, the second term, $p_Y(y)$, can be estimated from the results of ADS simulations on the FAAM circuit 850. In some embodiments, the first term $Pr(Z \in [z; z+dz] \mid Y \in [y; y+dy])$ and the second term, $p_Y(y)$ in equation (3) are determined based on Kernel density estimation techniques or histograms or other mathematical methods.

Having this in place, $p_Z(z)dz$ is numerically integrated from a to b, using some numerical quadrature or Monte Carlo methods, to get an estimate for $$\beta \approx \int_a^b \left[ \int_{-\infty}^{\infty} Pr(Z \in [z; z+dz] \mid Y \in [y; y+dy]) p_Y(y) dy \right] dz. \quad (4)$$

In principle, the conditional distribution of Z|Y=y is expected to be centered at or around y. In the most extreme case, $Pr(Z \in [z; z+dz] \mid Y \in [y; y+dy]) = \delta(z-y)$, where $\delta$ is the Dirac-delta, and the equation reduces to $$\beta \approx \int_a^b p_Y(z) dz = \hat{\beta},$$

which is the same thing as simply taking the FAAM circuit test coverage metrics and providing it to the customer. However, more often than not, Z|Y will have non-vanishing distribution around y and the transfer integral in equation (4) above needs to be calculated, in order to deliver accurate and reliable results to the customer. In some embodiments, the original test coverage metric is derived as, $$\alpha = 1 - \beta \quad (5)$$

Where β is derived from equation (4) above. The equation (5) above is referred to herein as a predefined original test coverage metric relation. In some embodiments, the test coverage metric determination module 130 is configured to implement the equation (5) above, in order to determine the original test metric α.

Figure 9:
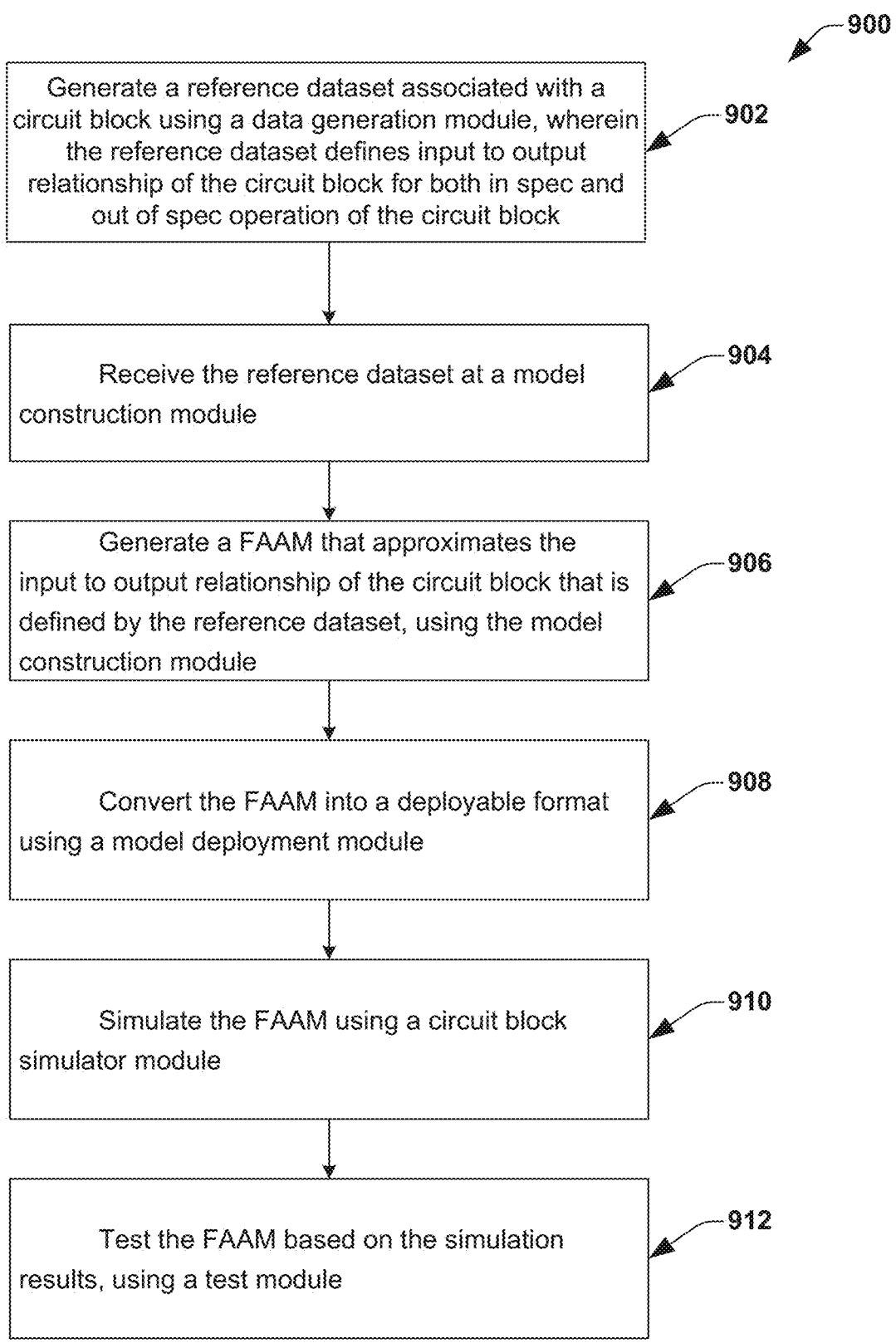
FIG. 9 illustrates a flow chart of a method of a fault aware analog model (FAAM) system, according to one embodiment of the disclosure.

FIG. 9 illustrates a flow chart of a method 900 of a fault aware analog model (FAAM) system, according to one embodiment of the disclosure. The method 900 is explained herein with reference to the FAAM system 100 in FIG. 1a. At 902, a reference dataset D associated with a circuit block is generated using a data generation module (e.g., the data generation module 102 in FIG. 1a). In some embodiments, the reference dataset D comprises a set of data values that defines the input to output relationship of the circuit block for both in spec and out of spec operation of the circuit block. At 904, the reference dataset D is received at a model construction module (e.g., the model construction module 106 in FIG. 1a). At 906, a FAAM that approximates the input to output relationship of the circuit block that is defined by the reference dataset is generated, using the model construction module. In some embodiments, the FAAM is generated at the model construction module using the lookup table approach as explained above with respect to FIGS. 3a-3b. Alternately, in other embodiments, the FAAM is generated at the model construction module using the machine learning approach as explained above with respect to FIG. 4.

At 908, the FAAM is converted to a deployable format, for example, into a serialized FAAM, using a model deployment module (e.g., the model deployment module 108 in FIG. 1a). At 910, the FAAM is simulated using a circuit block simulator module (e.g., the circuit block simulator module 120 in FIG. 6a and FIG. 6b). In some embodiments, the circuit block simulator module is coupled to one or more machine learning libraries using an application programming interface (API) module (e.g., the API module 122 in FIG. 5). At 912, the FAAM is tested based on the simulation results from the circuit block simulator module, using a test module (e.g., the test module 124 in FIG. 6a and FIG. 6b).

Figure 10:
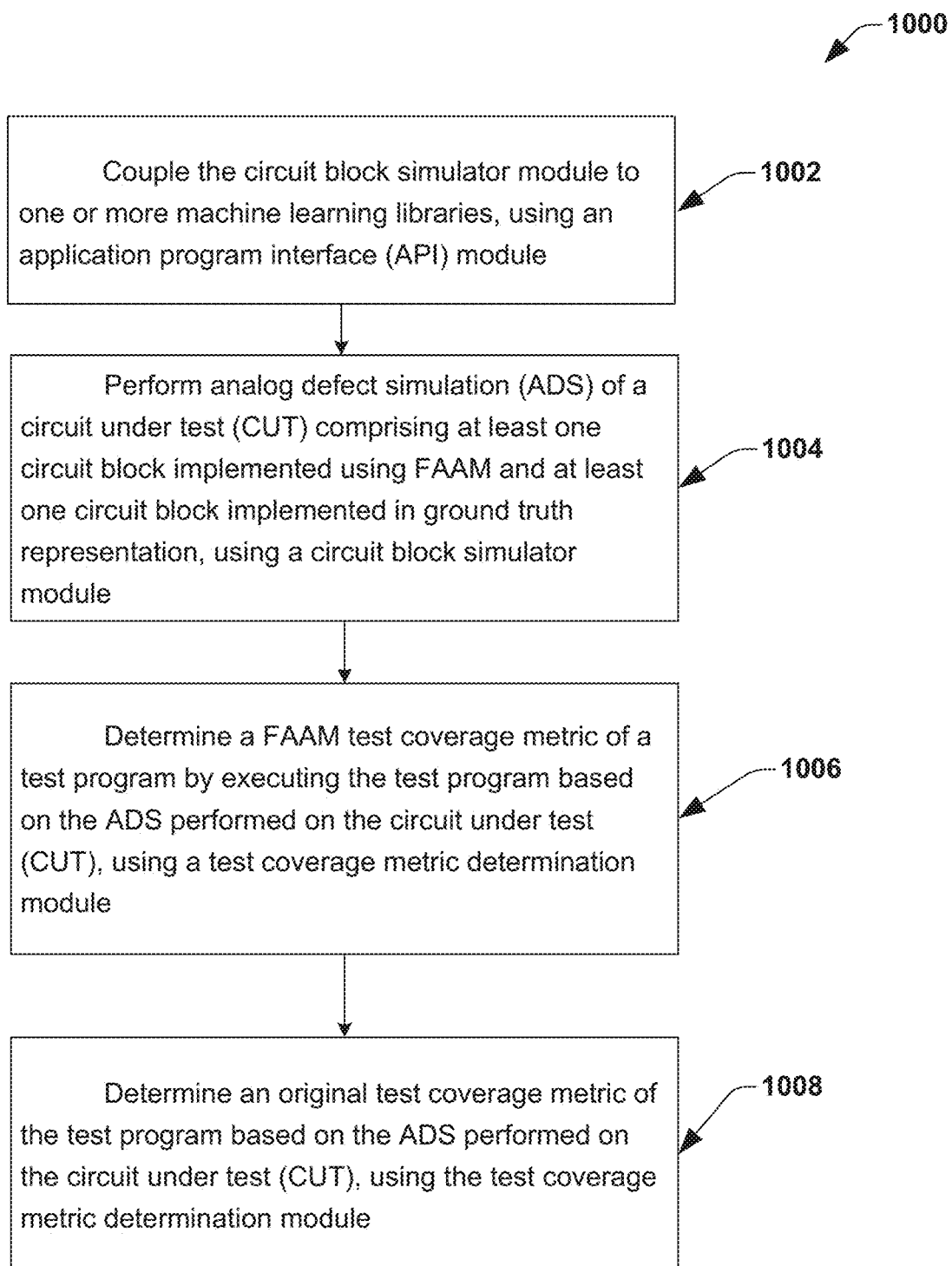
FIG. 10 illustrates a flow chart of a method of a simulator module, according to one embodiment of the disclosure.

FIG. 10 illustrates a flow chart of a method 1000 of a simulator module, according to one embodiment of the disclosure. In some embodiments, the method may be implemented within the simulator module 110 in FIG. 1a. In some embodiments, the simulator module 110 in FIG. 1a comprise one or more features described with respect to the simulator module 110 in FIGS. 5, 6a, 6b and 7a. Therefore, the method 1000 is explained herein with reference to the simulator module 110 in FIGS. 5, 6a, 6b and 7a. At 1002, a circuit block simulator module (e.g., the circuit block simulator module 120 in FIG. 5) is coupled to one or more machine learning libraries, using an application programming interface (API) module (e.g., the API module 122 in FIG. 5). At 1004, analog defect simulation (ADS) of a circuit under test (CUT) (e.g., the CUT 128 in FIG. 7a and FIG. 7b) comprising at least one circuit block implemented using a behavioral model/FAAM and at least one circuit block implemented in ground truth representation is performed, using the circuit block simulator module. In some embodiments, the ADS of the CUT is performed based on injecting defects (one defect per simulation) in the at least one circuit block implemented in ground truth representation. At 1006, a FAAM test coverage metric of a test program is determined by executing the test program based on the ADS performed on the circuit under test (CUT), using a test coverage metric determination module (e.g., the test coverage metric determination module 130 in FIG. 7*a*). At 1008, an original test coverage metric of the test program is determined based on the ADS performed on the circuit under test (CUT), using the test coverage metric determination module. In some embodiments, the original test coverage metric of the test program is determined based on the ADS performed on the circuit under test (CUT), in accordance with the predefined original test coverage metric relation in equation (5) above.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a fault aware analog model (FAAM) system, comprising a FAAM builder module comprising a model construction module configured to receive a reference dataset associated with a circuit block, the reference dataset comprising a set of data values that defines input to output relationship of the circuit block for both in spec and out of spec operation of the circuit block, wherein the reference data set is derived based on data associated with a ground truth representation of the circuit block; and generate a FAAM comprising a behavioral model of the circuit block, based on the reference dataset, wherein the FAAM is configured to approximate the input to output relationship of the circuit block that is defined by the set of data values in the reference dataset.

Example 2 is a FAAM system, including the subject matter of example 1, wherein, in order to generate the FAAM, the model construction module is configured to select a parametric model comprising a plurality of model parameters; split the reference dataset into at least a training dataset comprising a set of training data values and a test data set comprising a set of test data values, wherein both the set of training data values and the set of test data values comprises a set of input values and a corresponding set of output values associated therewith; and train the selected parametric model based on the training dataset, to form an optimized parametric model comprising a plurality of optimized model parameters that are configured to approximate the input to output relationship of the circuit block that is defined by the set of training data values in the training dataset.

Example 3 is a FAAM system, including the subject matter of examples 1-2, including or omitting elements, wherein the selected parametric model is trained by modifying the plurality of model parameters to form the plurality of optimized model parameters, based on the set of training data values in the training dataset, in accordance with a predefined goodness of fit function.

Example 4 is a FAAM system, including the subject matter of examples 1-3, including or omitting elements, wherein the model construction module is further configured to validate the optimized parametric model, based on an approximation error associated with output values provided by the optimized parametric model, when the optimized parametric model is provided with the set of input values in the test dataset, in order to form the FAAM, wherein the approximation error comprises an error in the output values provided by the optimized parametric model with respect to corresponding output values in the test dataset.

Example 5 is a FAAM system, including the subject matter of examples 1-4, including or omitting elements, wherein, when the approximation error is lesser than or equal to a predefined validation threshold, the optimized parametric model is identified as satisfactory, thereby forming the FAAM.

Example 6 is a FAAM system, including the subject matter of examples 1-5, including or omitting elements, wherein, when the approximation error is greater than the predefined validation threshold, the optimized parametric model is identified as unsatisfactory, and the model construction module is configured to iteratively generate one or more updated optimized parametric models based on updating the reference dataset or based on updating the parametric model, until the approximation error associated with an updated optimized parametric model is lesser than or equal to the predefined validation threshold, to form the FAAM.

Example 7 is a FAAM system, including the subject matter of examples 1-6, including or omitting elements, wherein, when the selected parametric model comprises a static model, the model construction module is further configured to reshuffle the reference dataset, prior to splitting the reference dataset into the training dataset and the test data set.

Example 8 is a FAAM system, including the subject matter of examples 1-7, including or omitting elements, wherein, in order to generate the FAAM, the model construction module is configured to utilize a nominal model of the circuit block that defines the input to output relationship of the circuit block using a mathematical relation between a set of input parameters and output parameters of the circuit block, and append the nominal model with one or more lookup tables (LUTs) derived based on the reference dataset, wherein each LUT of the one or more LUTs includes information of a variation of one or more output parameters of the nominal model for one or more input parameters of the nominal model.

Example 9 is a FAAM system, including the subject matter of examples 1-8, including or omitting elements, further comprising a data generation module configured to generate the reference dataset associated with the circuit block, based on the data associated with the ground truth representation of the circuit block.

Example 10 is a FAAM system, including the subject matter of examples 1-9, including or omitting elements, wherein the set of data values of the reference dataset comprises a set of input values that covers in spec and out of spec range of input values for the circuit block, and a corresponding set of output values measured using the ground truth representation of the circuit block.

Example 11 is a FAAM system, including the subject matter of examples 1-10, including or omitting elements, wherein, prior to the generation of the reference dataset, the data generation module is configured to identify input interfaces and output interfaces that corresponds to a type of the input values and the output values, respectively, to be included in the reference dataset; and discretize an input space comprising a range of input values that includes the in spec and out of spec range of input values for the circuit block to form the set of input values to be included within the reference dataset.

Example 12 is a FAAM system, including the subject matter of examples 1-11, including or omitting elements, wherein the FAAM builder module further comprises a model deployment module configured to convert the FAAM into a deployable format, prior to providing the FAAM to a simulator environment.

Example 13 is a FAAM system, including the subject matter of examples 1-12, including or omitting elements, wherein converting the FAAM into the deployable format comprises serializing the FAAM into a computer readable format, in order to store the FAAM to a non-transitory computer readable storage medium.

Example 14 is a FAAM system, including the subject matter of examples 1-13, including or omitting elements, wherein converting the FAAM into the deployable format comprises implementing the FAAM in a hardware description language (HDL).

Example 15 is a FAAM system, including the subject matter of examples 1-14, including or omitting elements, further comprising a simulator module that comprises a circuit block simulator module configured to receive the FAAM generated at the model construction module or a deployable version of the FAAM, in order to perform simulations of the circuit block using the FAAM.

Example 16 is a FAAM system, including the subject matter of examples 1-15, including or omitting elements, wherein the circuit block simulator module is further configured to receive a ground truth representation of the circuit block, and perform simulations of the FAAM and the ground truth representation using a same set of input values.

Example 17 is a FAAM system, including the subject matter of examples 1-16, including or omitting elements, wherein the simulator module further comprises a test module configured to receive output values associated with the simulations of both the ground truth representation and the FAAM, and compare the output values of both the ground truth representation and the FAAM, in order to verify a performance of the FAAM in a simulator environment.

Example 18 is a FAAM system, including the subject matter of examples 1-17, including or omitting elements, wherein the simulator module further comprises an application program interface (API) module configured to couple the circuit block simulator module to one or more machine learning libraries, in order to enable the circuit block simulator module to process and simulate the received FAAM.

Example 19 is a simulator module, comprising a circuit block simulator module configured to simulate at least one circuit block, wherein the at least one circuit block is implemented using a fault aware analog model (FAAM) of the circuit block, thereby forming a FAAM circuit block, wherein the FAAM comprises a behavioral model that is configured to approximate input to output relationship of the circuit block for both in spec and out of spec operation of the circuit block, and wherein the FAAM is derived based on a reference dataset comprising a set of input values and a corresponding set of output values of the circuit block for both in spec and out of spec operation of the circuit block, wherein the reference dataset is determined based on data associated with a ground truth representation of the circuit block.

Example 20 is a simulator module, including the subject matter of example 19, wherein the circuit block simulator module is further configured to simulate at least one circuit block that is implemented in ground truth representation, forming a ground truth circuit block and wherein the circuit block simulator module is configured to perform analog defect simulation (ADS) based on defects injected into the ground truth circuit block.

Example 21 is a simulator module, including the subject matter of examples 19-20, including or omitting elements, further comprising a test coverage metric determination module configured to determine an original test coverage metric of a test program by executing the test program based on an ADS of a circuit under test (CUT) comprising the at least one FAAM circuit block and the at least one ground truth circuit block, wherein the original test coverage defines a probability that the test program fails when there is a defect in an original circuit associated with the CUT, wherein the original circuit corresponds to a circuit when each circuit block within the CUT is implemented using a corresponding ground truth representation.

Example 22 is a simulator module, including the subject matter of examples 19-21, including or omitting elements, wherein the test coverage metric determination module is configured to determine the original test coverage metric, in accordance with a predefined original test coverage metric relation that is derived based on a first probability function that relates an output of the original circuit to the output of the CUT and a second probability function comprising a probability density of the output of the CUT, given there is a defect in the FAAM.

Example 23 is a simulator module, including the subject matter of examples 19-22, including or omitting elements, wherein the test coverage metric determination module is further configured to determine a FAAM test coverage metric of the test program by executing the test program based on the ADS performed on the CUT, wherein the FAAM test coverage metric defines a probability that the test program fails when there is a defect in the CUT.

Example 24 is a simulator module, including the subject matter of examples 19-23, including or omitting elements, further comprising an application program interface (API) module configured to couple the circuit block simulator module to one or more machine learning libraries, in order to enable the circuit block simulator module to simulate the at least one FAAM circuit block.

Example 25 is a simulator module, comprising a circuit block simulator module configured to simulate at least one circuit block; and an application program interface (API) module configured to couple the circuit block simulator module to one or more machine learning libraries, in order to enable the circuit block simulator module to simulate the at least one circuit block.

Example 26 is a simulator module, including the subject matter of example 25, wherein the at least one circuit block is implemented using a behavior model of the at least one circuit block.

Example 27 is a simulator module, including the subject matter of examples 25-26, including or omitting elements, wherein the circuit block simulator module is further configured to simulate at least one circuit block that is implemented in ground truth representation, forming a ground truth circuit block and wherein the circuit block simulator module is configured to perform analog defect simulation (ADS) based on defects injected into the ground truth circuit block.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. A fault aware analog model (FAAM) system, comprising
a FAAM builder module comprising a model construction module configured to:
receive a reference dataset associated with a circuit block, the reference dataset comprising a set of data values that defines an input to output relationship of the circuit block for both in spec and out of spec operation of the circuit block, wherein the set of data values of the reference dataset comprises a set of input values that covers in spec and out of spec range of input values for the circuit block, and a corresponding set of output values measured using a ground truth representation of the circuit block; and
generate a FAAM comprising a behavioral model of the circuit block, based on the reference dataset, wherein the FAAM is configured to approximate the input to output relationship of the circuit block that is defined by the set of data values in the reference dataset.

2. The FAAM system of claim 1, wherein, in order to generate the FAAM, the model construction module is configured to:
select a parametric model comprising a plurality of model parameters;
split the reference dataset into at least a training dataset comprising a set of training data values and a test dataset comprising a set of test data values, wherein both the set of training data values and the set of test data values comprises a respective set of input values and a corresponding respective set of output values associated therewith; and
train the selected parametric model based on the training dataset, to form an optimized parametric model comprising a plurality of optimized model parameters that are configured to approximate the input to output relationship of the circuit block that is defined by the set of training data values in the training dataset.

3. The FAAM system of claim 2, wherein the selected parametric model is trained by modifying the plurality of model parameters to form the plurality of optimized model parameters, based on the set of training data values in the training dataset, in accordance with a predefined goodness of fit function.

4. The FAAM system of claim 2, wherein the model construction module is further configured to validate the optimized parametric model, based on an approximation error associated with output values provided by the optimized parametric model, when the optimized parametric model is provided with the set of input values in the test dataset, in order to form the FAAM, wherein the approximation error comprises an error in the output values provided by the optimized parametric model with respect to corresponding output values in the test dataset.

5. The FAAM system of claim 4, wherein, when the approximation error is lesser than or equal to a predefined validation threshold, the optimized parametric model is identified as satisfactory, thereby forming the FAAM.

6. The FAAM system of claim 5, wherein, when the approximation error is greater than the predefined validation threshold, the optimized parametric model is identified as unsatisfactory, and the model construction module is configured to iteratively generate one or more updated optimized parametric models based on updating the reference dataset or based on updating the parametric model, until the approximation error associated with an updated optimized parametric model is lesser than or equal to the predefined validation threshold, to form the FAAM.

7. The FAAM system of claim 2, wherein, when the selected parametric model comprises a static model, the model construction module is further configured to reshuffle the reference dataset, prior to splitting the reference dataset into the training dataset and the test dataset.

8. The FAAM system of claim 1, wherein, in order to generate the FAAM, the model construction module is configured to utilize a nominal model of the circuit block that defines the input to output relationship of the circuit block using a mathematical relation between a set of input parameters and output parameters of the circuit block, and append the nominal model with one or more lookup tables (LUTs) derived based on the reference dataset, wherein each LUT of the one or more LUTs includes information of a variation of one or more output parameters of the nominal model for one or more input parameters of the nominal model.

9. The FAAM system of claim 1, further comprising a data generation module configured to generate the reference dataset associated with the circuit block.

10. The FAAM system of claim 9, wherein, prior to the generation of the reference dataset, the data generation module is configured to:
identify input interfaces and output interfaces that corresponds to a type of the set of input values and the set of output values, respectively, to be included in the reference dataset; and
discretize an input space comprising a range of input values that includes the in spec and out of spec range of input values for the circuit block to form the set of input values to be included within the reference dataset.

11. The FAAM system of claim 1, wherein the FAAM builder module further comprises a model deployment module configured to convert the FAAM into a deployable format, prior to providing the FAAM to a simulator environment.

12. The FAAM system of claim 11, wherein converting the FAAM into the deployable format comprises serializing the FAAM into a computer readable format, in order to store the FAAM to a non-transitory computer readable storage medium.

13. The FAAM system of claim 11, wherein converting the FAAM into the deployable format comprises implementing the FAAM in a hardware description language (HDL).

14. The FAAM system of claim 1, further comprising a simulator module that comprises a circuit block simulator module configured to receive the FAAM generated at the model construction module or a deployable version of the FAAM, in order to perform simulations of the circuit block using the FAAM.

15. The FAAM system of claim 14, wherein the circuit block simulator module is further configured to receive the ground truth representation of the circuit block, and perform simulations of the FAAM and the ground truth representation using a same set of input values.

16. The FAAM system of claim 15, wherein the simulator module further comprises a test module configured to receive output values associated with the simulations of both the ground truth representation and the FAAM, and compare the output values of both the ground truth representation and the FAAM, in order to verify a performance of the FAAM in a simulator environment.

17. The FAAM system of claim 14, wherein the simulator module further comprises an application program interface (API) module configured to couple the circuit block simulator module to one or more machine learning libraries, in order to enable the circuit block simulator module to process and simulate the received FAAM.

18. A simulator module, comprising:
a circuit block simulator module configured to simulate a fault aware analog model (FAAM) circuit block comprising a FAAM of a first circuit block,
wherein the FAAM comprises a behavioral model that is generated based on a reference dataset comprising a set of data values that comprises a set of input values that covers in spec and out of spec range of input values for the first circuit block, and a corresponding set of output values measured using a ground truth representation of the first circuit block, and wherein the FAAM is configured to approximate an input to output relationship of the first circuit block for both in spec and out of spec operation of the first circuit block as defined by the set of data values in the reference dataset.

19. The simulator module of claim 18, wherein the circuit block simulator module is further configured to simulate a ground truth circuit block comprising the ground truth representation of a second circuit block and wherein the circuit block simulator module is configured to perform analog defect simulation (ADS) based on defects injected into the ground truth circuit block.

20. The simulator module of claim 19, further comprising a test coverage metric determination module configured to determine an original test coverage metric of a test program by executing the test program based on an ADS of a circuit under test (CUT) comprising the FAAM circuit block and the ground truth circuit block, wherein the original test coverage defines a probability that the test program fails when there is a defect in an original circuit associated with the CUT, wherein the original circuit corresponds to a circuit when each circuit block within the CUT is implemented using a corresponding ground truth representation.

21. The simulator module of claim 20, wherein the test coverage metric determination module is configured to determine the original test coverage metric, in accordance with a predefined original test coverage metric relation that is derived based on a first probability function that relates an output of the original circuit to the output of the CUT and a second probability function comprising a probability density of the output of the CUT, given there is a defect in the FAAM.

22. The simulator module of claim 20, wherein the test coverage metric determination module is further configured to determine a FAAM test coverage metric of the test program by executing the test program based on the ADS performed on the CUT, wherein the FAAM test coverage metric defines a probability that the test program fails when there is a defect in the CUT.

23. The simulator module of claim 18, further comprising an application program interface (API) module configured to couple the circuit block simulator module to one or more machine learning libraries, in order to enable the circuit block simulator module to simulate the FAAM circuit block.

24. A simulator module, comprising:
a circuit block simulator module configured to simulate a behavioral model of a first circuit block, wherein the behavioral model comprises a computable parametric transformation that maps elements from an input set to elements from an output set associated with the first circuit block and wherein the behavioral model mimics a functionality of a ground truth of the first circuit block; and
an application program interface (API) module configured to couple the circuit block simulator module to one or more machine learning libraries, in order to enable the circuit block simulator module to simulate the behavioral model, when the behavioral model is compatible with the one or more machine learning libraries.

25. The simulator module of claim 24, wherein the circuit block simulator module is further configured to simulate a ground truth circuit block comprising a ground truth representation of a second circuit block and wherein the circuit block simulator module is configured to perform analog defect simulation (ADS) based on defects injected into the ground truth circuit block.

* * * * *